(12) United States Patent
Maurer et al.

(10) Patent No.: US 12,554,940 B2
(45) Date of Patent: Feb. 17, 2026

(54) GENERATING SUMMARY DATA FROM AUDIO DATA OR VIDEO DATA IN A GROUP-BASED COMMUNICATION SYSTEM

(71) Applicant: Salesforce, Inc., San Francisco, CA (US)

(72) Inventors: Aaron Josephus Maurer, McLean, VA (US); Katherine Jane Steigman, San Leandro, CA (US); Olivia Diane Grace, San Francisco, CA (US); Sohom Paul, Sugar Land, TX (US); McKenna Lowry, Valhalla, NY (US); Michael Hahn, San Francisco, CA (US); Jacquelyn Elizabeth Rocca, San Francisco, CA (US); Kelly Holmes Moran, Brooklyn, NY (US); Zachary Alan Kaarvik, New Westminster (CA); Leonard Jackson Shearer, San Francisco, CA (US); David Barrett-Kahn, New York City, NY (US); Wii Yatani, Roslyn, NY (US); Omar Lee, Berkeley, CA (US); Curtis Neil Allen, Jr., Denver, CO (US)

(73) Assignee: Salesforce, Inc., San Francisco, CA (US)

( * ) Notice: Subject to any disclaimer, the term of this patent is extended or adjusted under 35 U.S.C. 154(b) by 178 days.

(21) Appl. No.: 18/385,219

(22) Filed: Oct. 30, 2023

(65) Prior Publication Data
US 2024/0176960 A1    May 30, 2024

Related U.S. Application Data

(60) Provisional application No. 63/429,082, filed on Nov. 30, 2022.

(51) Int. Cl.
*G06F 17/00* (2019.01)
*G06F 16/34* (2019.01)
(Continued)

(52) U.S. Cl.
CPC ............ *G06F 40/40* (2020.01); *G06F 16/345* (2019.01); *H04L 65/403* (2013.01)

(58) Field of Classification Search
CPC ........ G06F 40/40; G06F 40/30; G06F 16/345; H04L 65/403
See application file for complete search history.

(56) References Cited

U.S. PATENT DOCUMENTS 10,108,613 B2 * 10/2018 Spataro .................. G06Q 10/10
10,664,529 B2 *  5/2020 Spataro .................. G06F 16/93
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Laurie A Ries
(74) *Attorney, Agent, or Firm* — Lee & Hayes, P.C.

(57) ABSTRACT

Techniques for transcribing and/or summarizing multimedia collaboration sessions are discussed herein. For example, users can communicate within a teleconferencing meeting associated with a channel. In some examples, a first machine learning model may be configured to receive audio-visual data and user interaction data (e.g., selected emojis, detected gestures, messages or text input by a user, a thread of messages, etc.) and output a teleconferencing meeting summary. In some examples, the teleconferencing meeting sum- (Continued)

mary can include one or more highlights, action items, and/or artificial intelligence (AI) notes generated using a machine learning model(s).

20 Claims, 12 Drawing Sheets

(51) Int. Cl.
*G06F 40/40* (2020.01)
*H04L 65/403* (2022.01)

(56) References Cited

U.S. PATENT DOCUMENTS

| | | | | |
|---|---|---|---|---|
| 11,645,476 | B2* | 5/2023 | Chiari | G06F 40/47 704/2 |
| 11,790,168 | B2* | 10/2023 | Yoo | H04L 12/1813 704/9 |
| 11,823,680 | B2* | 11/2023 | Carbune | H04L 51/224 |
| 12,272,353 | B2* | 4/2025 | Zhou | G06F 40/35 |
| 12,307,063 | B2* | 5/2025 | Vijayakumar | H04L 51/043 |
| 2017/0017639 | A1* | 1/2017 | Bute | H04W 8/205 |
| 2018/0287982 | A1 | 10/2018 | Draeger et al. | |
| 2019/0272547 | A1* | 9/2019 | Coman | G06Q 10/063 |
| 2019/0306211 | A1* | 10/2019 | Swanston | G06Q 30/0241 |
| 2019/0392837 | A1* | 12/2019 | Jung | G10L 15/22 |
| 2020/0090659 | A1* | 3/2020 | Castelli | G06F 16/48 |
| 2022/0207392 | A1* | 6/2022 | Hou | G10L 15/26 |
| 2022/0294799 | A1* | 9/2022 | Madaan | G06F 16/2379 |
| 2023/0115098 | A1* | 4/2023 | Miller | G06F 40/30 704/235 |
| 2024/0273139 | A1* | 8/2024 | Miller | G06F 3/0484 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516> (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Dikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: < URL: https://tedium.co/2017/10/17/irc-vs-slack-chat-history/> (dated Oct. 17, 2017) 13 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 5 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.
PCT Search Report and Written Opinion mailed on Jan. 30, 2024 for PCT Application No. PCT/US2023/077066 from PCT Summary, 26 pages.

* cited by examiner

FIG. 2B

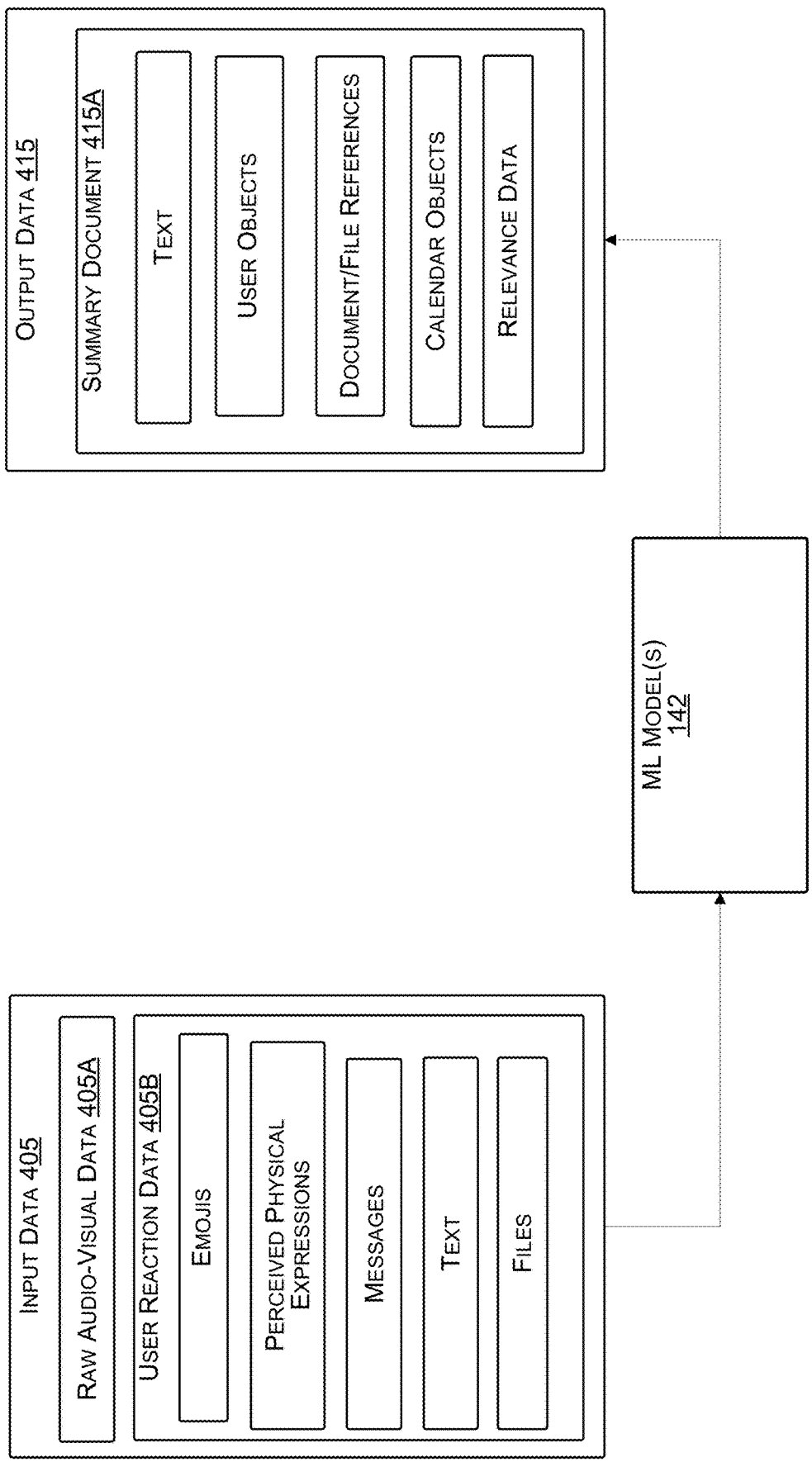

GENERATING SUMMARY DATA FROM AUDIO DATA OR VIDEO DATA IN A GROUP-BASED COMMUNICATION SYSTEM

RELATED APPLICATIONS

This application claims the benefit of, and priority to U.S. Provisional Application No. 63,429,082, filed on Nov. 30, 2022, which is incorporated herein by reference.

TECHNICAL FIELD

Communication platforms are becoming increasingly popular for facilitating work-related communications, such as for project collaboration within a single organization and across two or more organizations. To facilitate project collaboration, users often share information or engage in ad hoc discussions within the communication platforms. However, reviewing conversations within communication platforms requires large amounts of time to extract important parts of the conversation. Existing systems may allow a user to search through the conversation based on key terms, search functions, and the like to access relevant portions of the conversation or may provide transcripts of the ad hoc discussions.

In voice-to-text transcription, a neural network classifies uttered sounds as either containing a phoneme (a unit of speech) or not, and matches the phonemes to well-known words, phrases, and sentences based upon the model being previously trained on a set of audio clips of speech and text transcripts of the speech. However, existing voice-to-text transcription methods may not robustly contextualize audio (and/or video) data where there are accompanying non-verbal signals.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 2B illustrates a user interface for multimedia collaboration sessions within the group-based communication system for certain examples.

FIG. 4 depicts a pictorial diagram of a machine-learning model trainable to receive input and use the input to output a summary document for certain examples.

DETAILED DESCRIPTION

The following detailed description addresses the above deficiencies by using a combination of signals, including non-verbal signals contextualizing audio-video data, to more robustly transcribe and/or summarize synchronous or asynchronous multimedia collaboration sessions in a group-based communication platform.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized, and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

Figure 1:
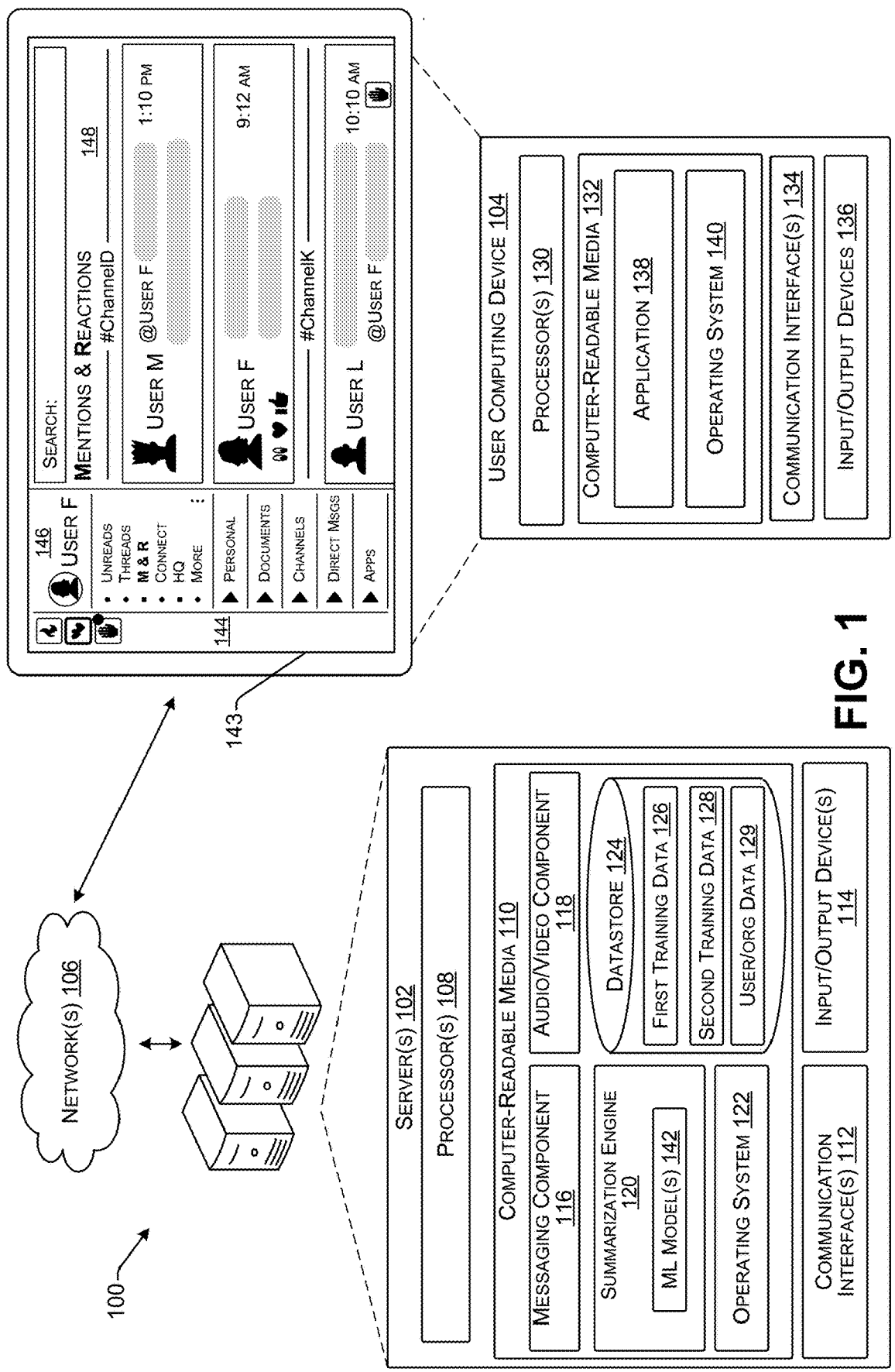
FIG. 1 illustrates an example system for performing techniques described herein.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a summarization engine 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and can, based on the identified update, cause a notification associated with the update to be presented in association with a sidebar of user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and further can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and then, based on the completion, generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and further can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the summarization engine 120 can manage transcription and/or summarization of synchronous and/or asynchronous multimedia collaboration sessions. The summarization engine 120 may be tasked with transcribing and/or summarizing a multimedia collaboration session and generating one or more summary documents that represent actionable tasks and/or deadlines characterizing the multimedia collaboration session. The summarization engine 120 may utilize a machine-learning (ML) model(s) 142 (or MLM) that accepts inputs, and using the inputs, outputs such a summary document(s). In various examples, a virtual space (e.g., a group DM, a direct DM, a communication channel, etc.) may be created or otherwise accessed to discuss tasks and deadlines related to various objectives, and within the virtual space, users may collaborate with one another, via the synchronous multimedia collaboration session, regarding accomplishing the objectives. This may involve the users posting messages to the virtual space, posting content (e.g., audio, video, links, files, etc.) to the virtual space, and so forth. Thus, in at least some examples, the inputs to the ML model(s) 142 may include the ambient data associated with the synchronous multimedia collaboration session including the real-time communications that takes place within the virtual space between other users. However, the ML model(s) 142 may have access to various other data generating the one or more summary documents, such as relationship data between participants of the multimedia session, context data of the virtual space (e.g., virtual space data, channel data, message data, thread data, emoji data, reactji data, and the like), organization data, etc.

The ML model(s) 142 may be trained to transcribe and/or summarize the communications within the virtual space. For example, the ML model(s) 142 may distill important parts of a conversation within the virtual space based on contextual cues, a frequency of communications by the user(s), past feedback, communications (or other interactions of the users) exceeding a threshold level, communications of the user being marked as a favorite, an assignment of tasks to users, a rating of the users, an expertise of the user, user preferences implied on their respective roles, user specified parameters, user specified permissions, heuristics from user activities, emojis, reacjiis, and/or other interactions of the users with previously generated summary documents. Additionally, the ML model(s) 142 may be trained to identify one or more users to be associated with tasks or assignments that comprise the summary document(s) such as those users that were mentioned in the virtual space, those who posted to the virtual space, or those who are members of the virtual space. The ML model(s) 142 may also be trained to identify the respective messages, contributions, posts, and the like for the user(s) within the virtual space. Accordingly, the ML model(s) 142 may infer actionable context from the inputs it ingests and output summary document(s) representative of such actionable context. For example, the ML model(s) 142 may be trained to infer from a frequency of communications between two users exceeding a threshold level and other context clues that a first user and a second user represent the assignor and assignee of a task.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user computing device 104. The datastore 124 can comprise multiple databases, which can at least include first training data 126 and second training data 128. Additional or alternative data may be stored in the datastore 124 and/or one or more other datastores. For example, the datastore 124 may alternatively or additionally store one or more summary documents (not shown) therein.

In at least one example, the user/org data 129 can include data associated with users of the communication platform. In at least one example, the user/org data 129 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 129 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 129. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 129 can include data associated with one or more organizations of the communication platform. In at least one example, the user/org data 129 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, virtual space data can include data associated with one or more virtual spaces associated with the communication platform. The virtual space data can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via WebSockets, Application Programming Interfaces (APIs) (e.g., using API calls), Hypertext Transfer Protocols (HTTPS), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and further can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 143 is shown in FIG. 1. As illustrated in FIG. 1, the user interface 143 can present data associated with one or more virtual spaces, which may include one or more workspaces. That is, in some examples, the user interface 143 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 143 can include a first region 144, or pane, that includes indicator(s) (e.g., user interface element(s) or object(s)) associated with workspace(s) with which the user (e.g., account of the user) is associated. In some examples, the user interface 143 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 143.

In at least one example, the user interface 143 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via WebSockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the summarization engine 120, and the application 138, techniques described herein can be performed by any other component, or combination of components, which can be associated with the server(s) 102, the user computing device 104, or a combination thereof.

User Interface for a Group-Based Communication System

Figure 2A:
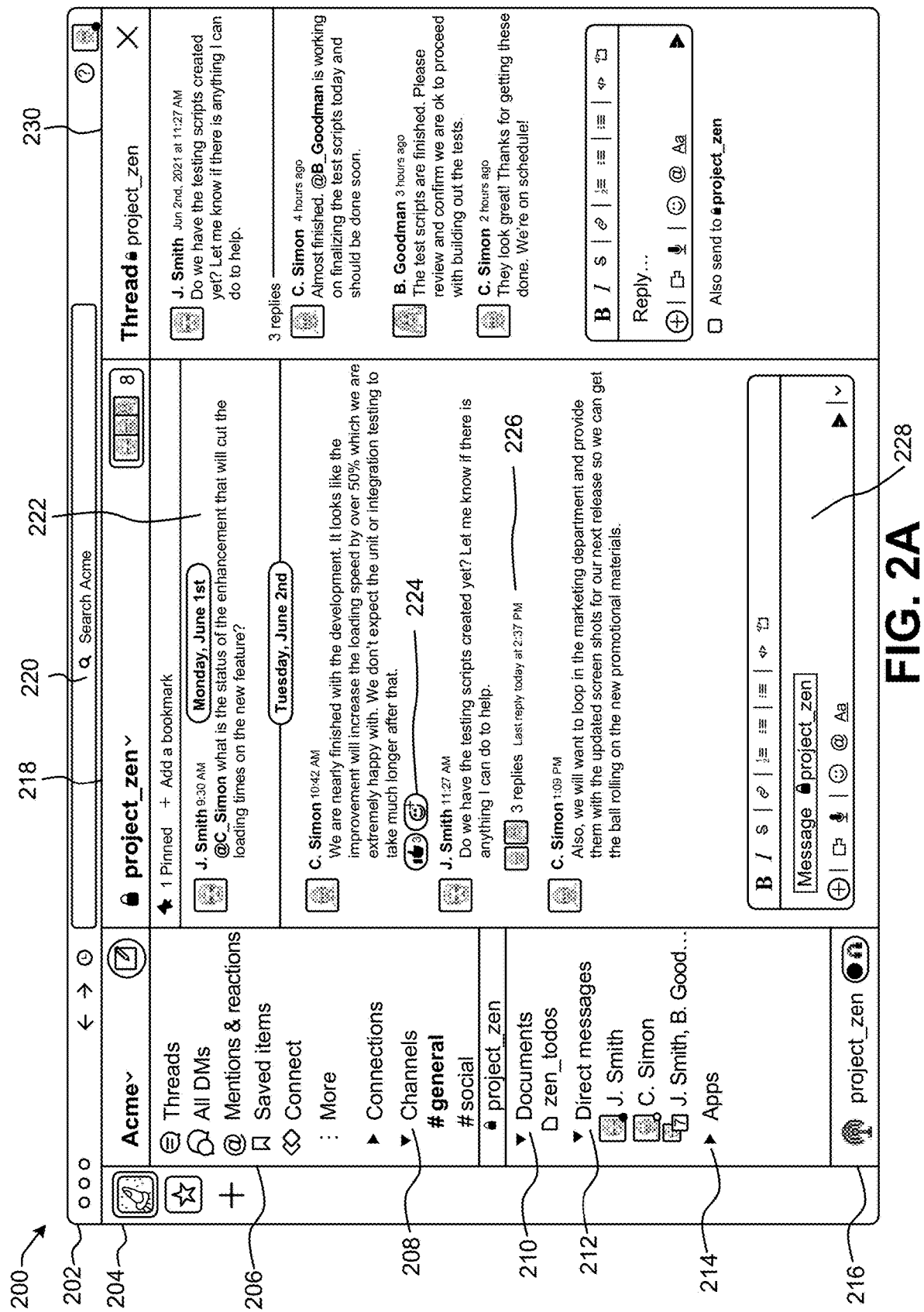
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200, the user can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.). When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel, they can view messages 222 and may react to messages (e.g., by selecting a reaction button 224), reply in a thread, start threads, and the like. Further, a channel pane 218 can include a compose pane 228 to compose message(s) and/or other data to associate with a channel. In some examples, the user interface 200 can include a thread pane 230 that provides additional levels of detail of the messages 222. In some examples, different panes can be resized, panes can be popped out to independent windows, and/or independent windows can be merged to multiple panes of the user interface 200. In some examples, users may communicate with other users via a multimedia collaboration session pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or alternatively may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or the communication channels can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Transcribing and/or Summarizing Multimedia Collaboration Sessions

Conventional transcription algorithms merely transform audio signal data and apply linguistics models in order to output written language from spoken language. However, conventional transcription models are ill equipped to consider the robust contextual data that is inherent in group-based communication channels. Accordingly, conventional transcription models typically provide only a textual record absent of any contextually actionable information. In contrast, an ML model(s) as disclosed in various examples herein (such as ML model(s) 142) may be trained at least to ingest the data comprising a multimedia collaboration session and output a summary document characterized by the most contextually relevant and/or actionable information disseminated during the multimedia collaboration session. That is, the ML model(s) of various examples may be trained to leverage the channel context associated with a virtual space within which a multimedia collaboration session is initiated. Such non-verbal context includes, but is not limited to, identities of and relationships between users of the group-based communication platform, references to users (i.e., @-mentions), the submission of documents or other file types in conjunction with discussion, etc. This channel context provides powerful data with which to train the ML model(s) of various examples to extrapolate meeting objectives, goals, intent, targets, or the like. The ML model(s) of various examples may therefore be advantageously trained to at least learn one or more relationships between instances of ambient data comprising a multimedia collaboration session and transcripts representative of the synchronous multimedia collaboration session in various examples disclosed herein. In at least some examples, the machine learning model(s) may be trained to learn one or more relationships between instances of ambient data and transcripts that define tasks and deadlines, or otherwise correlate actors with actions to be taken and timeframes within which to take the actions.

Figure 2B:
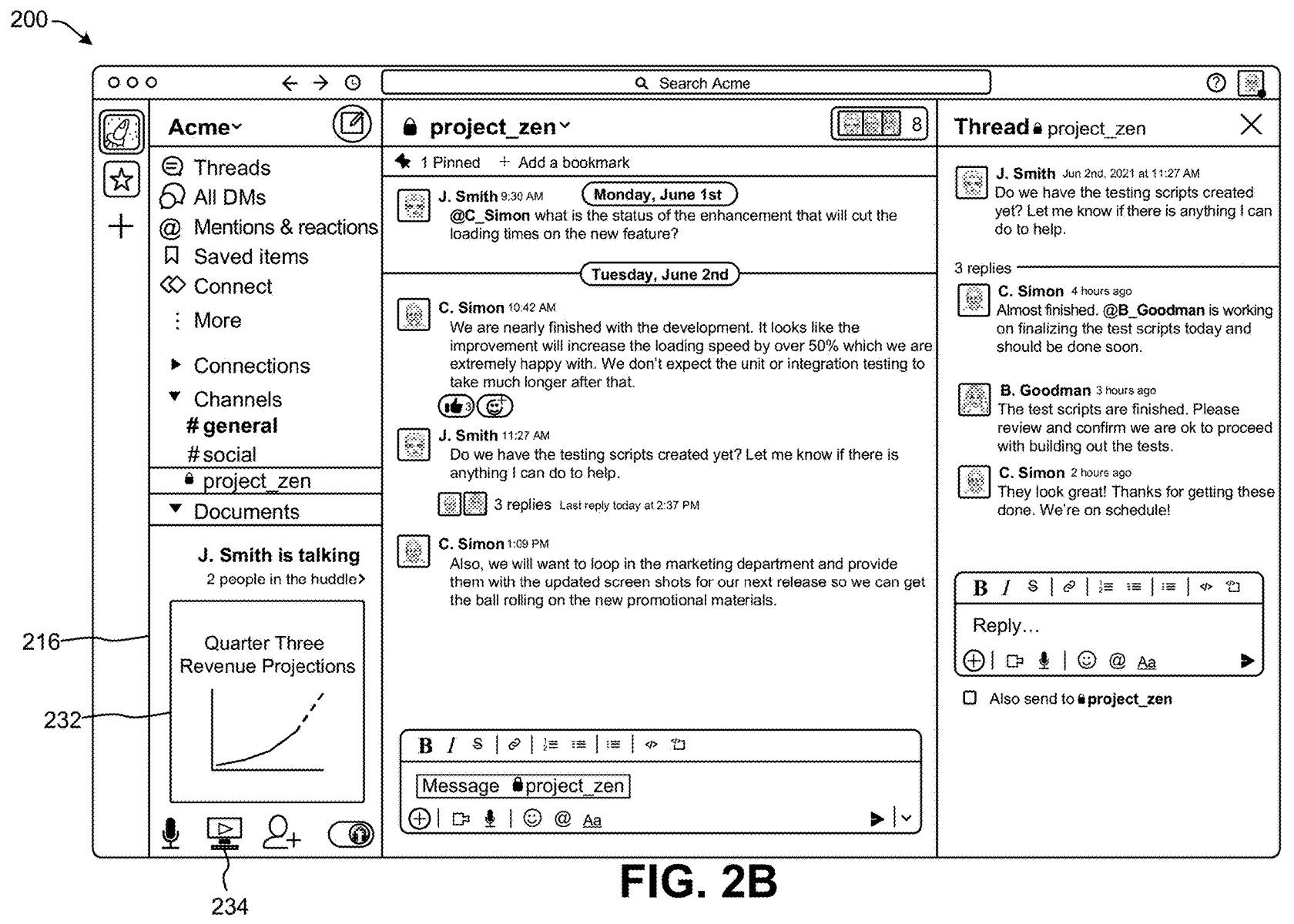

FIG. 2B illustrates a multimedia collaboration session (e.g., a synchronous multimedia collaboration session, also referred to herein as an audio and/or video meeting) that has been triggered from a channel, as shown in synchronous multimedia collaboration session pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users to facilitate the completion of tasks according to deadlines Synchronous multimedia collaboration session pane 216 may be associated with a synchronous multimedia collaboration session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example, starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

In some examples, contents of the synchronous multimedia collaboration session may automatically be persisted in a channel associated with the synchronous multimedia collaboration session. Members of a particular synchronous multimedia collaboration session can post messages within a thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the multimedia collaboration session pane 216 is active, the multimedia collaboration session pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

In other examples, multimedia collaboration sessions may be short, ephemeral sessions from which no data is persisted. In yet some other examples, multimedia collaboration sessions may be recorded, transcribed, and/or summarized for later review and interaction.

Figure 5:
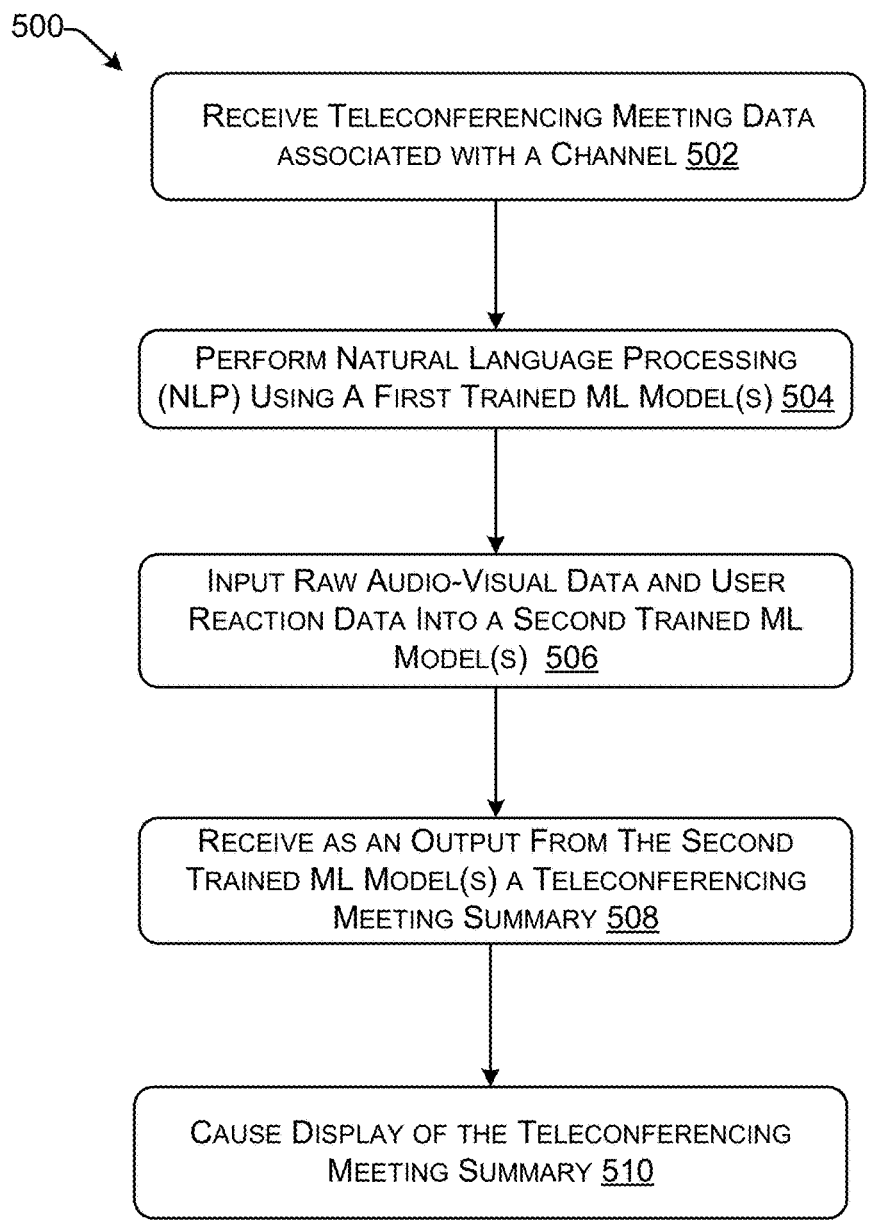
FIG. 5 illustrates an example process associated with generating a summary document for a synchronous multimedia collaboration session within virtual space.

Additional discussion of determining summary data is provided in connection with FIGS. 4 and 5, as well as throughout the disclosure.

Connecting Within the Group-Based Communication System

Figure 2C:
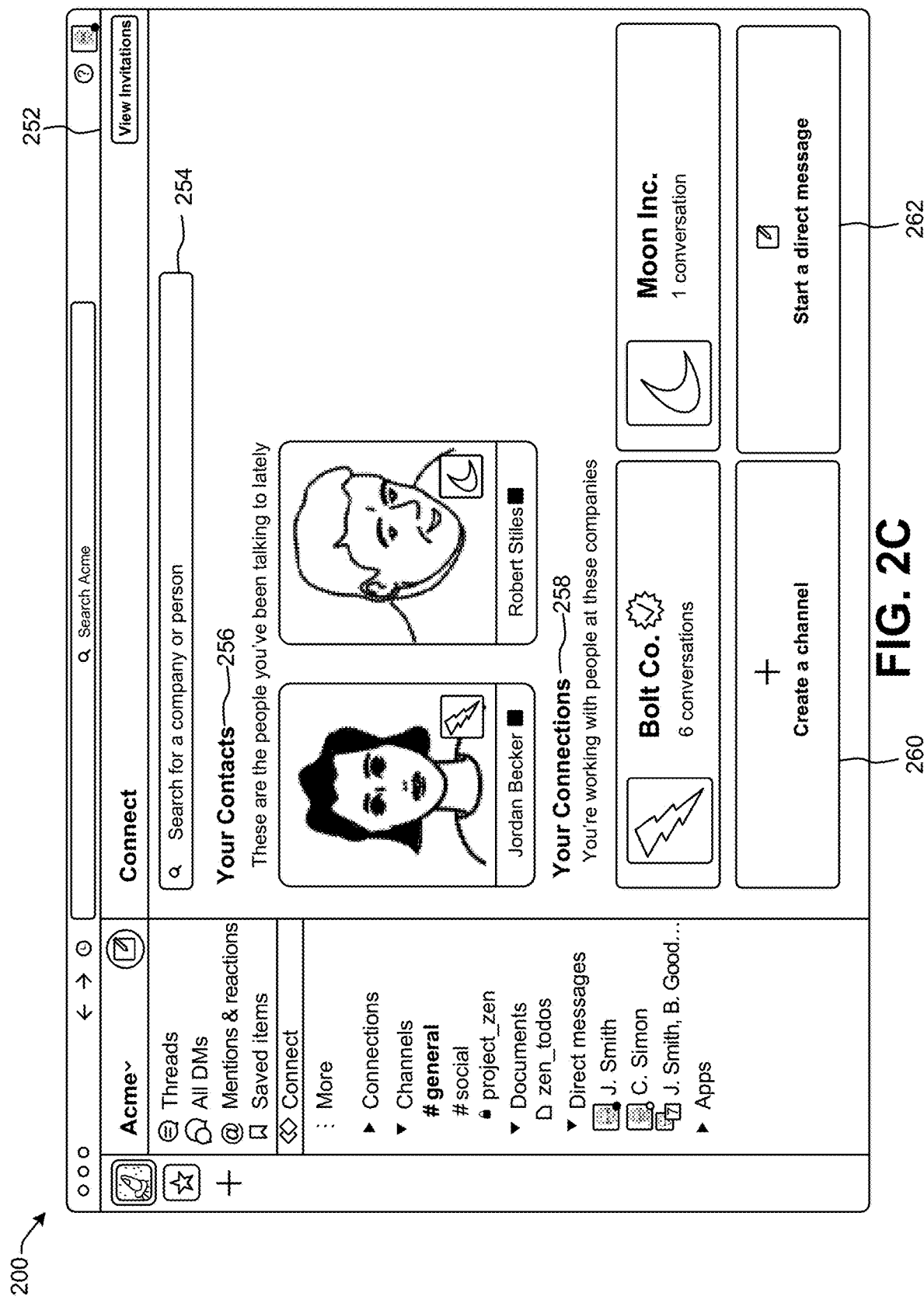
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username.

Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
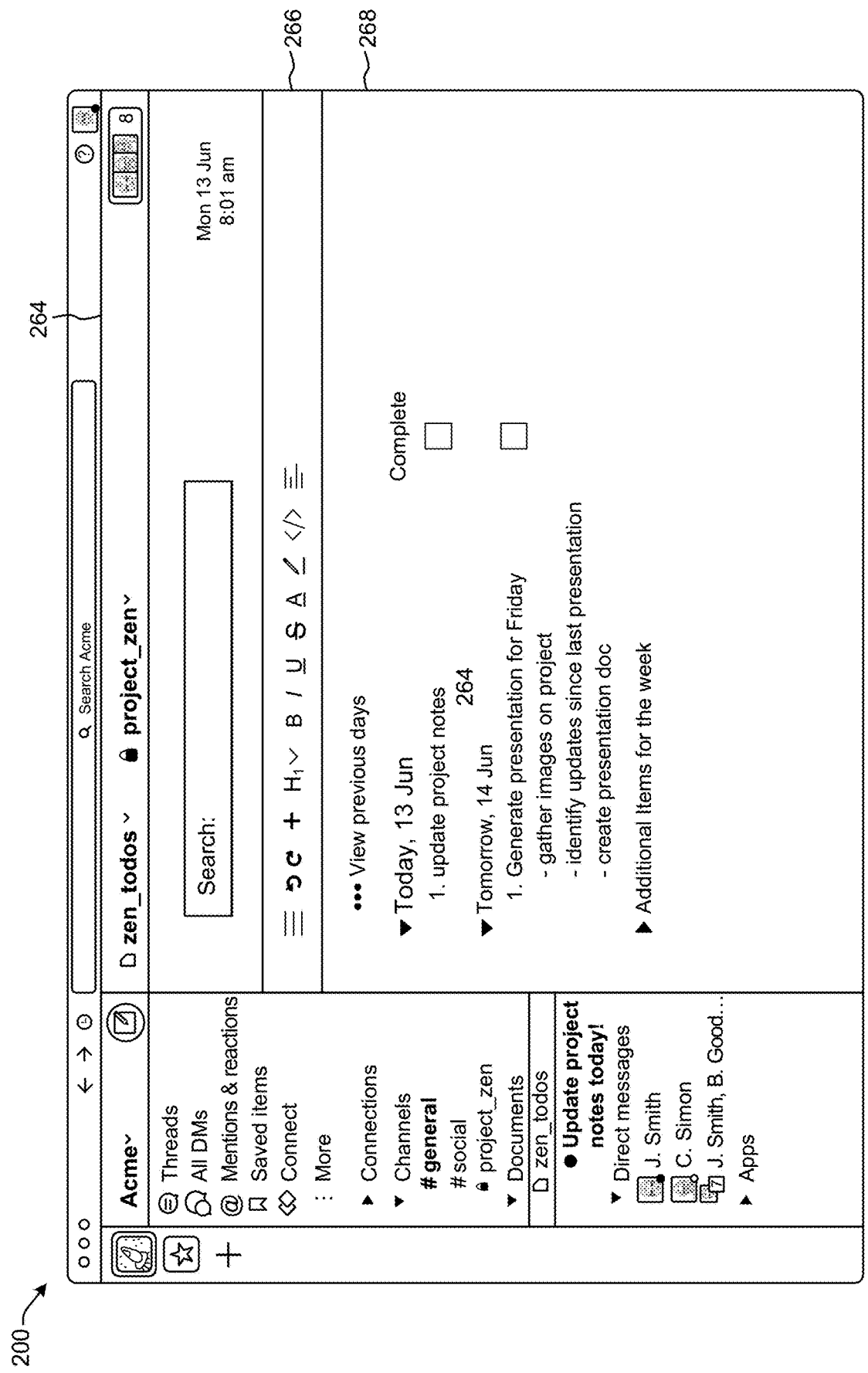
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively, or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIFs, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
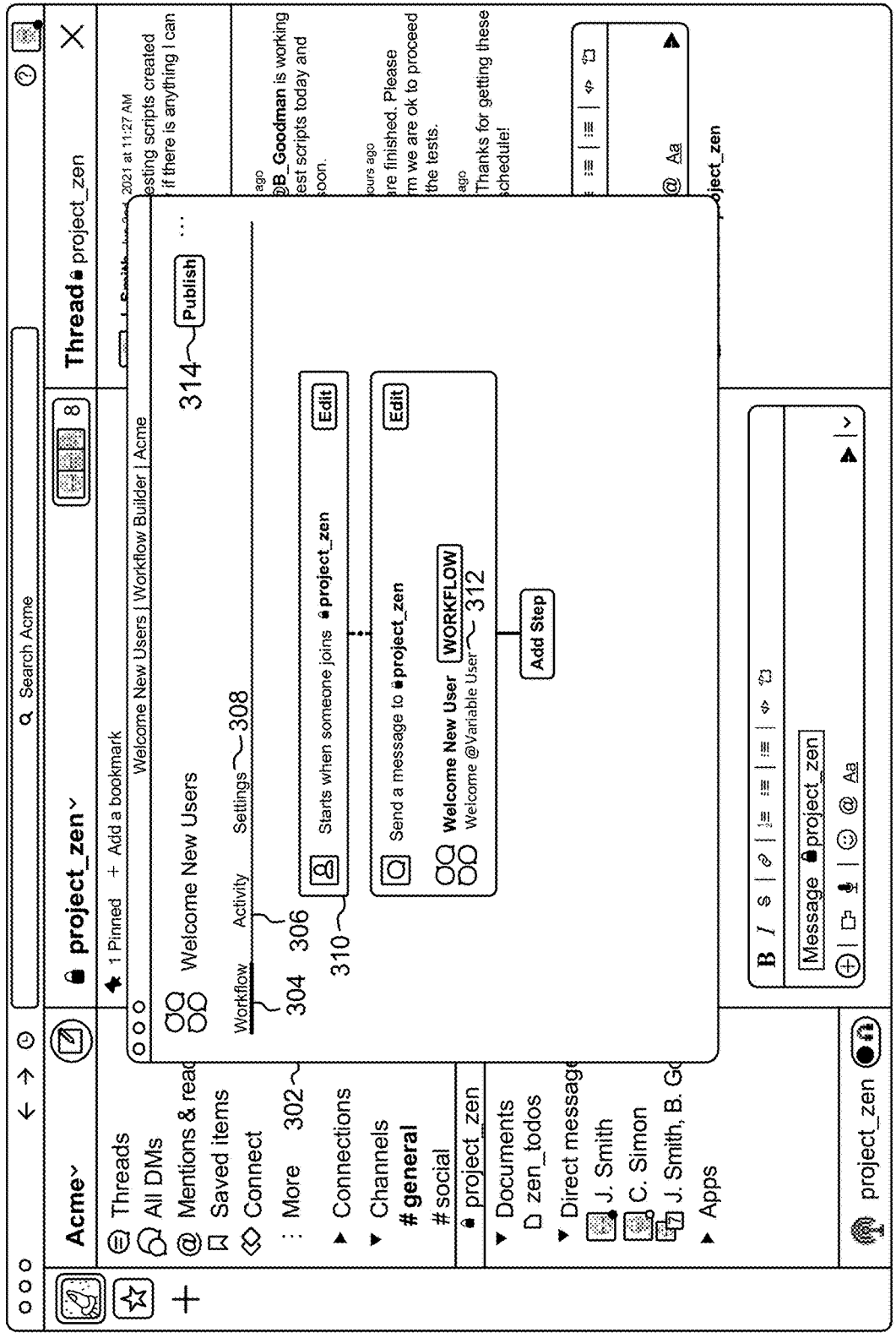
FIG. 3A depicts a user interface for workflows within a group-based communication system

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel, and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
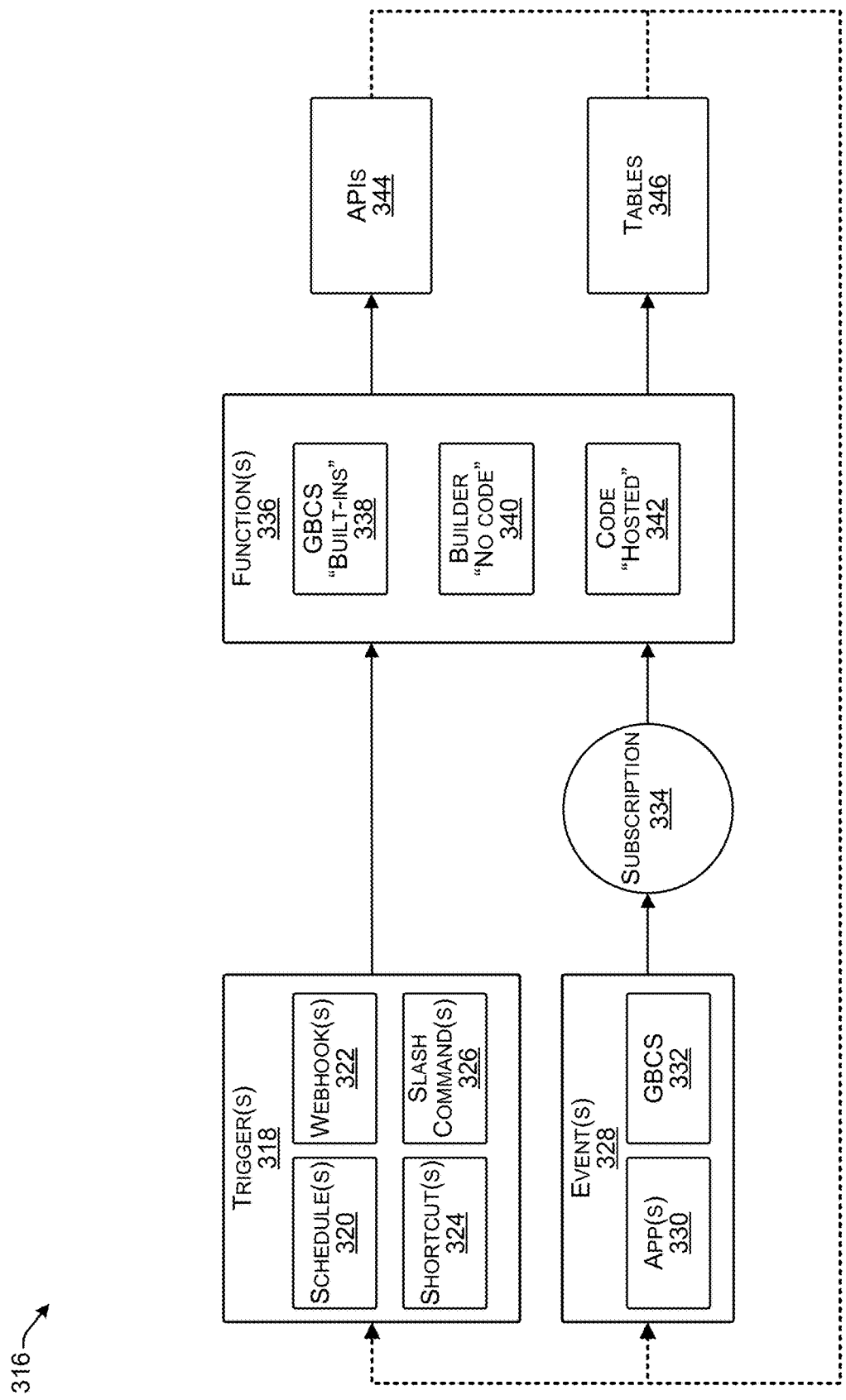
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Determining Summary Data

FIG. 4 depicts a pictorial diagram of a ML model trainable to receive input and use the input to output a summary document for certain examples.

The server(s) 102 (not shown) may be configured to implement the ML model(s) 142 that ingests input data 405. The input data 405 may be the ambient data comprising a synchronous multimedia collaboration session that includes the raw audio-visual data 405A, user reaction data 405B, contextual data, and the like. As used herein, the phrase "raw audio-visual data" denotes audio-visual data as it is received or ingested directly from a providing instrument. Thus, raw audio-visual data may include, for example, audio-visual data presented in an instrument-specific format or having processing steps already performed within or prior to reaching the providing instrument. However, such raw audio-visual data does not exclude ambient audio-visual data being or having been processed, filtered, or otherwise altered during or substantially contemporaneously with a synchronous multimedia collaboration session comprising the audio-visual data. Examples of raw audio-visual data 405A include, without limit, video streams, augmented/virtual reality streams, audio streams including uncompressed audio, lossless audio, lossy compressed audio, and video or audio stream data that has been modified or augmented, including, for example, video or images that have been modified by filters or the like. Further, the server(s) 102 is configured in some cases to extract audio data from video data and separately parse and analyze the audio and video data. Examples of user reaction data 405B include, without limit, emojis, perceived physical expressions, text (and/or keyboard strokes), messages, and the like).

As discussed above with regard to FIG. 2A, communication channels or other virtual spaces may be associated with data and/or content. For example, the user interface 200 described above may include a compose pane by which a user may transmit messages comprising text (i.e., ASCII characters). The ML model(s) 142 of various examples may thus be trained to receive and/or retrieve input data 405 in order to transcribe and/or summarize the synchronous multimedia collaboration session. That is, the ML model(s) 142 of various examples may be trained to receive input data 405 and parse the raw audio-visual data and user reaction data to infer context related to the multimedia collaboration session and/or retrieve prior contextual data associated with the virtual space. For example, the ML model(s) 142 may be trained to receive and parse a message or other data sent or posted to the virtual space to identify metadata associated with the message that comprises one or more of a sending user identifier, a message identifier, a group identifier, a communication channel identifier, or the like.

The ML model(s) may also be configured to recognize certain users within the virtual space. For example, users within the virtual space may have certain roles (e.g., CEO, CTO, etc.). The ML model(s) 142 may also be trained to learn relationships between users based on these roles. For example, the ML model(s) 142 may be trained to learn relationships between authorship metadata and editing metadata associated with messages and various file or document types to infer a supervisor-supervisee relationship. The ML model(s) 142 may be trained to apply a certain pre-determined weight to a user's communications based on their roles/relationships. For example, the communications of a channel owner may be given a greater weight as compared to other users in the channel. In some examples, the ML model(s) 142 may be trained to identify or receive an input as to the weight to be applied to the communications of these individuals, and their communications may be given precedent when generating the summary document. In at least some examples, the ML model(s) 142 may be trained to identify communications as constituting one or more of an assignment of tasks to users and a deadline to complete the task, and accordingly assign greater weight to such communications. However, the ML model(s) 142 may additionally, or alternatively, give precedent to the communications of certain users based on a recency of communications by the user, a frequency of communications by the user, communications (or other interactions of the users) exceeding a threshold level, communications of the user being marked as a favorite, a rating of the users, an expertise of the user, user preferences implied on their respective roles, user specified parameters, user specified permissions, heuristics from user activities, and/or other interactions of the users with previously generated summary documents.

Returning now to FIG. 4, in some cases, the machine-learning model 142 may comprise a singular ML model that is trainable to fuse the various data types comprising the input data 405. For example, the machine learning model 142 may comprise a deep neural network (DNN), capable of multimodal fusion of audio, video, and text data. Accordingly, the machine-learning model 142 of some examples may comprise a DNN architecture including separate fully connected layers per data modality. That is, the ML model(s) 142 may be trained to learn relationships between instances of input data of the same type (such as for example, by implementing pairs of fully connected layers per data modality). The outputs of each fully connected layer may then be merged (such as by concatenation). Alternatively, the ML model 142 may comprise a first model and second model (not shown), each model being trainable to learn relationships between input data of different types and transcripts. That is, the first model and second model comprising the ML model 142 of some examples may implement ensemble learning algorithms. In some examples, the ML model(s) 142 may include a Generative Pre-trained Transformer 3 (GPT-3) model, a neural model for summarization, such as an abstractive or a generative summarization model, a machine-learned summarization model, natural language processing, machine learning, and/or other techniques that identify meaning and/or sentiment in messages within the virtual space and/or the communication session.

The output data 415 may comprise a summary document 415A that summarizes the content posted and communication that occurred within the virtual space during the synchronous multimedia collaboration session. In this manner, the communication platform can treat the summary document 415A as a synopsis or outline of the synchronous multimedia collaboration session and the tasks, deadlines, etc. that were discussed. As such, functionalities of the virtual space may be imbued in the summary document. The summary document 415A may accordingly identify action (s), upload(s), conversation(s) (such as conversation threads), and the like that transpired in the virtual space. Particularly, the summary document 415A may include data characterizing one or more objectives of the multimedia collaboration session in terms of tasks and/or deadlines. The data may include text, user objects, documents and/or references or links to files, calendar objects, relevance data and the like. The text may be organized into any appropriate format including, but not limited to, bullet-point format, paragraph format, table format, and the like. For example, the text may identify by username or other ID, one or more users and the respective actions they are to take. In some cases, the summary document 415A may support editable text. In at least some examples, the ML model(s) 142 may be trained to rank identified topics of conversation according to one or more relevance regimes. The ML model(s) 142 may implement any appropriate ranking metric including mean average precision, discounted cumulative gain or the like. Accordingly, the summary document 415A may classify text or other content by a relevance score or other indicator of overall significance.

The summary document may also identify action(s), upload(s), conversation(s), and the like that transpired in the virtual space. For example, the summary document may include message timing documentation (e.g., time stamps) associated with messages between the user, audio and/or video communications, file uploads, notifications, new messages posted, mentions or tags, mentioning or tagging functionalities, event conveyance, workflow management and tracking, access permissions, and/or other functionalities that occurred within the virtual space or which are enabled based on the type of virtual space.

Further, the summary document 415A may include various objects that can be ordered, added, deleted, modified and/or the like. Such objects can include, but are not limited to, files (e.g., text, messages previously transmitted via the communication platform, audio, video, an application, local objects, remote objects (e.g., third-party objects), etc.) or links thereto, and calendar objects indicating tasks to be completed or other events (e.g., a scheduled event, a calendar invite, etc.). Accordingly, the ML model(s) 142 of various examples may be tasked with using the input data 405 to learn to automatically schedule meetings with participants of the synchronous multimedia collaboration session, automatically assign tasks from a list of tasks input via a user interface (i.e., typed into a chat interface within a virtual space), automatically send links to documents referenced in the synchronous multimedia collaboration session and the like. Thus, the ML model(s) 142 of some examples may be trained to use the input data 405 to define a series of executable steps necessary to accomplish the tasks discussed during the synchronous multimedia collaboration session. The executable steps may be defined in some examples by one or more summary objects (i.e., object code or the like). In examples where the summary document 415A is configured for display within a user interface, execution of the series of steps may be initiated by user interaction. The ML model(s) 142 may be trained to generate one or more summary interface elements associated with the summary objects to receive the user interaction and thereby initiate completion of the tasks.

For example, the ML model(s) 142 can receive audio/video data, messages, emojis, etc. associated with the audio/video data (e.g., from a text/emoji based message by and between participants of the meeting), contextual data (e.g., channel data, virtual space data, organization data, relationships data, and the like) and can output one or more summary documents summarizing the contents of a meeting and/or can provide any tasks, deadlines, and/or action items from the meeting. The ML model(s) 142 can classify text based on comparing embeddings associated with text from the meeting with embeddings (e.g., intermediate output data of the ML model(s) 142 such as a vector encoding a portion of data) associated with the channel to determine relevancy data. For example, a distance between embeddings can indicate that a discussion in a meeting is more similar to discussion in a channel, and therefore may be more relevant to determining action items, tasks, deadlines, etc. If a distance between embeddings meets or exceeds a threshold the text from the meeting can be down weighted when determining a summary in the summary document.

FIG. 5 illustrates an example process 500 associated with generating a summary document characterizing a synchronous multimedia collaboration session within a virtual space.

In some examples, the process 500 may begin at operation 502, which may include receiving teleconferencing meeting data associated with a channel of the group-based communication platform. In some examples, the teleconferencing meeting data may be the ambient data associated with a synchronous multimedia collaboration session that is occurring within the channel of the group-based communication platform. Thus, in some examples, the teleconferencing meeting data may include raw audio-visual data and user reaction data. Further, the user reaction data of some examples includes one or more of an emoji selected by a user, a user's perceived physical expressions (e.g., a gesture detected using machine vision techniques from video data), messages or text input by the user (e.g., during the meeting), or a thread of messages input by a plurality of users (e.g., associated with a channel or virtual space). In some examples, the user reaction data comprises messages or text input to a user interface proximate video data substantially simultaneously during generation of the audio-visual data In at least some examples, receiving raw audio-visual data includes capturing and/or transforming audio-visual signals recorded by analog or digital devices. In some examples, receiving user reaction data includes at least capturing keystroke or mouse click data recorded by analog or digital devices. In other words, the server(s) 102 of various examples may be configured to interpret selection of a user interface object representing a reaction (i.e., an emoji) or a combination of keystrokes (e.g., a succession of capitalized letters, a succession of repeated characters or the like) as representative of a user reaction. In various other examples, receiving user reaction data includes at least capturing audio-visual data comprising user reactions (e.g., vocal inflections, gaze patterns, etc.).

In some examples, the process 500 may at operation 504 include performing, using a first trained ML model such as the ML model(s) 142 described above, natural language processing (NLP) on the raw audio-visual data to generate transcript data associated with the teleconferencing meeting. In some cases, performing NLP may include transforming and/or interpreting keystroke data recorded by analog or digital devices and perform one or more of keystroke identification analysis, keystroke verification analysis, keystroke logging or the like. That is, the ML model(s) 142 may be trained to interpret keystroke data in order to identify a participant in a synchronous multimedia collaboration session, verify that the participant provided certain input to the synchronous multimedia collaboration session, label syntactic patterns or the like. In some examples, the ML model(s) may further be trained to analyze and interpret keystroke data to infer that a received corpus of keystroke data comprises computer code. For example, the ML model(s) 142 may be trained to recognize pre-defined keystroke combinations as constituting a beginning or ending of coding syntax. In at least some cases, the ML model may be trained to rank the contextual relevance of individual instances of teleconferencing meeting data. Thus, in the above example, the ML model(s) 142 may be trained to rank the coding syntax as having a higher contextual relevance within a communication channel dedicated to the launch of a new computer software product than does audio data determined to be conversation related to "today's lunch."

In some examples, the ML model(s) 142 can comprise a single ML model or in some examples can comprise a number of ML models with discrete tasks (e.g., a first ML model can convert speech to text, a second ML model can determine a summary, a third ML model can determine action items/relevant details based on context data from a channel, and the like).

In certain cases, generation of transcript data may occur in real-time. Thus, the ML model(s) of some examples may be trained to transform and/or interpret received audio-visual signals and perform one or more of speech recognition, voice recognition, environmental sound recognition or other such audio analysis. In some examples, performing NLP includes statistically correlating one or more interpreted emotions and/or gaze patterns with text data to infer context. In at least one non-limiting example, performing NLP may include determining a semantic distance associated with a recognized term uttered or otherwise input by a participant within a synchronous multimedia collaboration session. Thus, if, for example, a synchronous multimedia collaboration session is initiated within the project_zen channel (which is dedicated to discussion of ongoing software development efforts for Project Zen), the ML model(s) 142 may be trained to recognize any of the frequently occurring terms "development," "testing," "scripts" or the like as particularly relevant contextually. In this example, embeddings associated with these terms indicate that discussions within the channel are more relevant when generating action items.

In some examples, the process 500 may at operation 506 include inputting, into a second trained ML model (which may be similar to the ML model(s) 142 described above), the raw audio-visual data and the user reaction data.

In some examples, the process 500 may at operation 508 include receiving, as an output from the second trained ML model, a teleconferencing meeting summary associated with the teleconferencing meeting data. In at least some cases, the teleconferencing meeting summary may be configured for display within an interface of a display of a user device. Moreover, the summary of various examples may therefore comprise one or more summary objects configured for execution by the user device. As described just above, the ML models) may be configured to output a contextually actionable record or "summary document" representative of a synchronous multimedia collaboration session. That is, the ML model(s) 142 of various examples described herein may be configured to create one or more data structures that may perform tasks within a group-based communication platform. Thus, in at least some cases, the summary document may comprise one or more collaborative documents, as described in further detail with reference to FIG. 2D. In at least some cases, the ML model(s) 142 may further be configured to associate one or more summary interface elements with the one or more respective summary objects. Each summary interface element may be configured to receive user interaction, and thereby initiate execution of the task(s) associated with the summary object. Returning briefly to our Project Zen example, as illustrated in FIG. 2D, the one or more summary objects may comprise a task list associated with the dates of June 13 and 14. The corresponding summary interface elements comprise checkboxes that are configured to receive user interaction to indicate completion of certain tasks.

In some examples, the process 500 may terminate at operation 510, which may include causing display of the teleconferencing meeting summary. In at least some examples, causing display of the teleconferencing meeting summary may be initiated by a user request.

Figure 6:
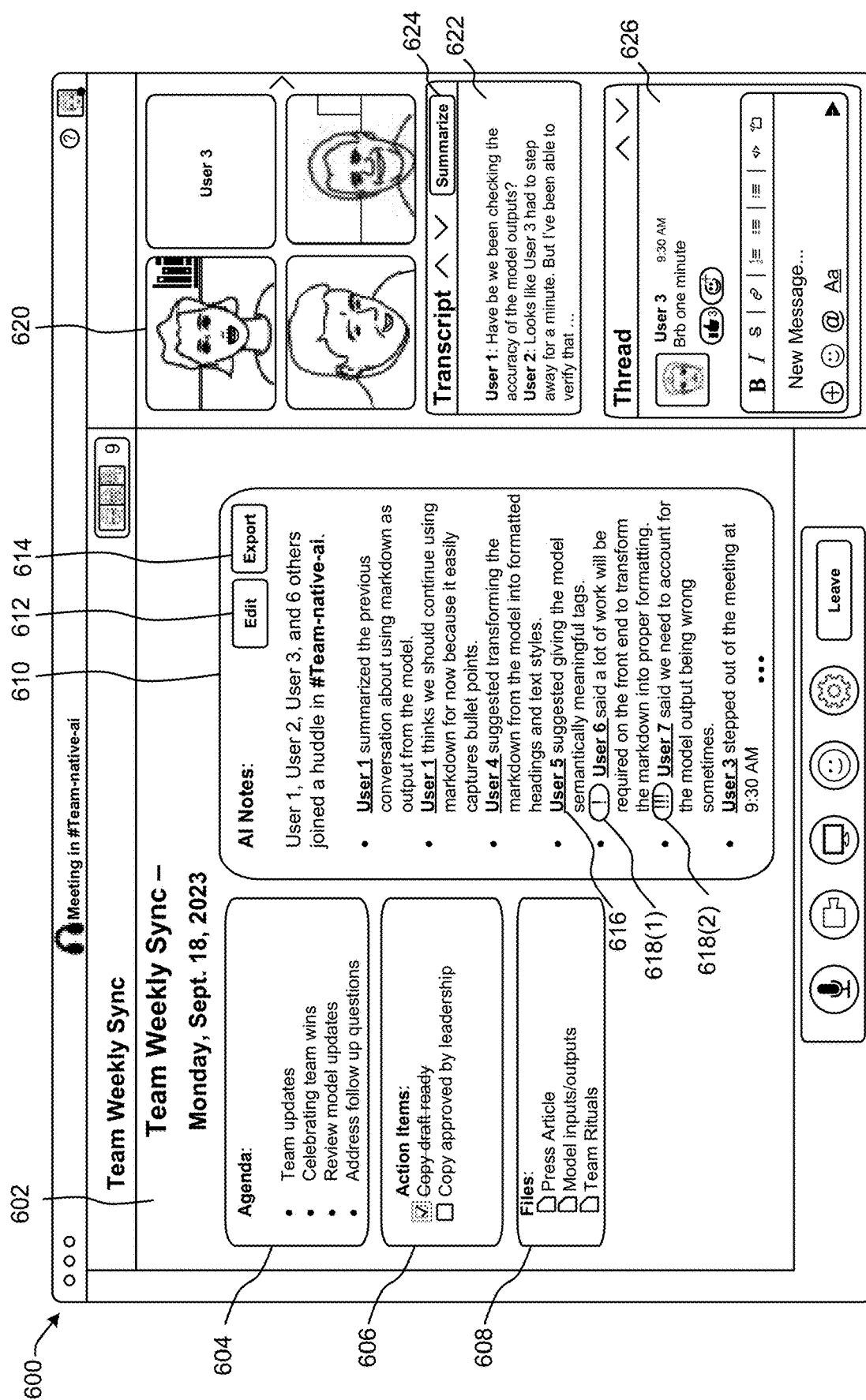
FIG. 6 illustrates an example user interface for requesting and generating a summary of a synchronous multimedia collaboration session and generating notes during the synchronous multimedia collaboration session.

FIG. 6 illustrates an example user interface 600 associated with a communication platform for allowing a user to request and generate a summary of a teleconferencing meeting. FIG. 6 also illustrates the generation of artificial intelligence (AI) notes or annotations during the teleconferencing meeting.

The example user interface 600 illustrates an example multimedia collaboration session (also referred to herein as a teleconferencing meeting). Users of the group-based communication system can join and leave the synchronous multimedia collaboration session at any time, without disrupting the session for other users. As discussed above in relation to FIG. 2A, a synchronous multimedia collaboration session may be based around a particular topic, a particular channel, a particular direct message or multi-person direct message, etc. to facilitate the completion of tasks according to deadlines. In the particular example, the multimedia collaboration session is based around a channel (e.g., #Team-native-ai channel). In some examples, users may start a synchronous multimedia collaboration session in a channel as a means of communicating with other members of that channel who are presently online.

In at least one example, the user interface 600 may include multiple sections, subsections, and/or panes presenting various data or content. For example, a first section 602 may include an agenda subsection 604, action items subsection 606, files subsection 608, an artificial intelligence (AI) notes 610 subsection, and/or the like. In some examples, the user interface 600 may include a live video 620 of one or more users, a transcript 622 (generated in real time or near time time) of the teleconferencing meeting, a thread 626, and/or tools 628 that enable a user to control various features of the collaboration session. Although the user interface 600 is shown including certain fields or text, other content is envisioned.

In some examples, contents presented in the first section 602 may have been added or uploaded from another virtual space, such as a canvas, communication channel, workspace, collaborative document, etc. associated with the communication platform. Contents uploaded or pulled from a virtual space may include textual data, audio data, video data, images, files and/or any other type of data that may be configured to be presented in the first section 602 of the synchronous multimedia collaboration session. In some examples, the content items presented in the first section 602 may be entered and/or edited during the teleconferencing meeting by one or more users. Alternatively, or in addition to, one or more of the content items in the first section 602 may be generated and/or updated using a ML model.

In some examples, one or more ML model(s) may generate and output information that may be presented via the user interface 600. For example, a first ML model can convert speech to text as the teleconferencing meeting progresses (e.g., transcript 622), a second ML model can further process or filter the text to remove redundant or irrelevant data, a third ML model can generate (i.e., output) a summary of the teleconferencing meeting from the filtered data input into the third ML model, a fourth ML model can determine action items/relevant details based on context data from a channel, a fifth ML model can output AI notes in near real time during the teleconferencing meeting, and/or a sixth ML model can be configured to predict a likelihood of receiving a request to generate a summary. In some examples, the information generated by a ML model (e.g., a transcript, summary of the teleconferencing meeting, AI notes, etc.) may be downloaded, and/or uploaded to a different part of the communication platform (e.g., a channel or workspace).

In some examples, a ML model(s) can be trained based in part on analyzing and learning relationships (e.g., as learned relationship data) between (i) first data that includes prior audio-visual data, and (ii) second data that includes prior summary data. In some examples, a ML model(s) may be configured to analyze channel contextual data based in part on channel data associated with the channel that the teleconferencing meeting was initiated from (e.g., as shown in FIG. 6, a meeting was initiated from the #Team-native-ai channel). In some examples, the channel contextual data may be input into a ML model configured to output a summary of the teleconferencing meeting.

The agenda subsection 604 may represent a list of items a user(s) plans to discuss during the teleconferencing meeting. The action items subsection 606 may include action item(s) that have or have not been completed from a prior teleconferencing meeting action item(s) that were copied or uploaded from a virtual space (e.g., a channel, a thread, a canvas, etc.), and/or action items that a user manually entered as opposed to action items that were generated by a ML model. The files subsection 608 may include documents and/or links to documents, web pages, channels, etc. that may be relevant to the teleconferencing meeting. Information presented in the agenda subsection 604, action items subsection 606, and/or the files subsection 608 may be input into one or more ML models configured to output a transcript of the teleconferencing meeting, a summary of the teleconferencing meeting, the AI notes during the teleconferencing meeting, and/or action items presented in the AI notes. In some examples, this additional information may provide contextual data and assist the ML model(s) in determining relevancy of information.

The transcript 622 may be generated by a ML model using known speech recognition techniques. The transcript 622 can include a textual representation of the audio and/or video data, user reactions (e.g., emojis), messages typed in the thread 626, etc. In some examples, the audio/video component can generate the transcript concurrently or substantially concurrently with teleconferencing meeting. In some examples, the audio/video component can generate the transcript upon receiving an indication of selection of a "generate transcript" indicator (not shown), upon receiving an indication of selection of a record indicator, automatically upon initiation of the teleconferencing meeting (e.g., based on a permission and/or setting associated with a user account, channel, workspace, communication platform, etc.). In at least one example, the audio/video component can be configured to cause presentation of the transcript 622 in association with a virtual space with which the audio and/or video conversation is associated. For example, a first user can initiate an audio and/or video conversation in association with a meeting or communication channel.

In some examples, the audio/video component can process audio and/or video data between attendees of the teleconferencing meeting and generate a transcript of the audio, video data, and/or message data. For example, the transcript can include a timestamped text typed into the thread 626 (i.e., the transcript can include that User 3, at 9:30 AM typed "Brb one minute" into the thread 626). In some examples, the transcript can include reactions and/or emojis selected by one or more user's during the teleconferencing meeting in response to what a user said, a user's edit to an agenda, a user's edit to an action item, a user's edit to AI notes, a user's thread message or reply (e.g., a timestamp of a thumbs up to User 3's thread message at 9:30 AM). In at least one example, the audio/video component can render one or more sections of the transcript selectable for commenting, such as to enable members of the communication channel to comment on, or further contribute to, the conversation. In some examples, the audio/video component can update the transcript based on the comments.

In some examples, the audio/video component may stop generating the transcript upon receiving an indication that the conversation is complete (e.g., an indication that a host or administrator associated therewith has ended the collaboration meeting, that a threshold number of attendees have closed associated interfaces (e.g., more than 50% of the attendees, more than 75% of the attendees, etc.), the teleconferencing meeting is no longer being recorded, and/or the like. In some examples, the audio/video component can identify a completion of the conversation and then, based on the completion, generate the transcript associated therewith.

In some examples, a ML model(s) may be configured to receive, as input, the raw audio-visual data, user reaction data (e.g., an emoji selected by a user), a detected gesture in the video (e.g., a user shaking their head "no", nodding "yes", waving goodbye, and the like), messages or text input by the user (e.g., a user making an edit to the AI notes 610), a thread of messages input by a plurality of users (e.g., in thread 626) and/or other data and filter the text to remove redundant and/or irrelevant data using. Removing redundant and/or irrelevant data or information decreases the amount of data a ML model configured to output a summary and/or AI notes has to process. The output from a first ML model configured to filter audio-visual data and/or user interaction data may be input into another ML model (e.g., summarization model such as a large language model (LLM)) that outputs a summary of the teleconferencing meeting and/or AI notes during the teleconferencing meeting. Using an additional ML model may decrease latency issues and/or an error rate that may be associated with using a single ML model or a ML model that would otherwise process unfiltered data. In some examples, determining what data is irrelevant is based at least in part on determining and comparing the context of all the data associated with the teleconferencing meeting.

The user interface 600 may also include a "summarize" affordance 624 (e.g., a graphical indicator) that initiates the summarization of the teleconferencing meeting or a portion of the teleconferencing meeting. For example, to initiate the generation of a summary of the teleconferencing meeting (e.g., an audio and/or video meeting in the channel #Team-native-ai), a user may select the summarize affordance 624. In response, the user interface may display a dialogue window that allows the user to input specifics or criteria of the summary to be generated. For example, a user may request a summary of what a particular user said or a group of users, a topic discussed, discussion surrounding a keyword (e.g., emergency, deadline, rollout, etc.), a summary of a particular time or times of the meeting (e.g., the first 5 minutes and/or the last 5 minutes), a summary of action items, high-level themes, or any combination thereof. In such examples, the requested summary may be presented within a section or pane of the user interface 600, in a second window, prompt a user to download the summary to the user's computing device, etc.

In some examples, the teleconferencing meeting summary may be automatically generated at the end of the meeting. In some examples, a teleconferencing meeting summary may automatically be generated for a meeting that lasts a threshold amount of time (e.g., at least 10 minutes, 15 minutes, etc.). In some examples, a ML model may be configured to predict a likelihood that a user(s) will request the teleconferencing meeting summary at the end of the meeting. Predicting when a teleconferencing meeting summary may be requested enables the ML model to pre-compute at least a portion of the teleconferencing meeting summary before the teleconferencing meeting ends. For instance, the transcript, AI notes, audio-visual data, and/or the user reaction data may be input into a ML model(s) configured to predict a likelihood or estimate as to how likely a user(s) will request a summary of the meeting during the meeting. For example, determining that a teleconferencing meeting summary is likely to be requested may be based at least in part on the transcript, AI notes, audio-visual data, etc. indicating a user had to leave the teleconferencing meeting early, a threshold number of action items (e.g., 3 or more) were generated or discussed during the meeting, based on a status or identity of one or more users in the meeting (e.g., higher likelihood of requesting a teleconferencing meeting summary when a manager attended the meeting, and/or a new employee), the duration of a teleconferencing meeting (e.g., higher likelihood of requesting a summary when the teleconferencing meeting lasted a threshold amount of time), based on the number of users present in the meeting (e.g., higher likelihood of a user requesting a summary when a threshold number of users attended and/or participated), based on topics discussed, based on a number of questions and/or answers discussed, and the like.

In some examples, AI notes 610 may be generated using a ML model as the teleconferencing meeting progresses (i.e., in real-time or near real-time). In some examples, a ML model is configured to generate AI notes by processing data as it becomes available or based on a predetermined data set or time frames (e.g., data received every minute, two minutes, etc.). In some examples, the ML model may be prompted to generate a data set when the transcript reaches a conclusion (e.g., upon determining there is a change in topic, upon detecting a user joined/left the meeting, detecting a number of reactions exceeding a threshold or average, etc.). That is, a ML model may be configured to measure a similarity between text and predict whether the conversation has changed in a significant way. In at least one example, a dedicated ML model may be used to logically divide the transcript into data sets that may be input into a large language model (LLM).

The generated AI notes 610 may include information related to the teleconferencing meeting. For instance, the AI notes 610 subsection may summarize a user's explanation (e.g., "User 1 summarized the previous conversion about using markdown as output from the model"), a response, a suggestion (e.g., "User 1 thinks we should continue using markdown for now because it easily captures bullet points", or "User 4 suggested transforming the markdown from the model into formatted headings and text styles," etc.), a question (e.g., "User 2 asked what can be done about the tagging issue"), note when a user steps out of the meeting (e.g., "User 3 left the meeting at 9:30 AM" as determined based on the transcript, a thread message, a reply, a video camera turning off, a user stepping out of view of the camera, etc.) and the like.

In some examples, the AI notes may include generated action items, takeaways, highlights, and the like of the teleconferencing meeting. In examples, the action items, short summaries, takeaways, and/or highlights may be presented in a bullet-point format, paragraph format, table format, and the like. Individual action items, short summaries, takeaways, and/or highlights may be associated with a link that, when selected, directs a user to a particular portion of the transcript and/or video associated with that particular action item, short summary, takeaway, or highlight. For example, selecting link 616 associated with the bullet point providing that "User 5 suggested giving the model semantically meaningful tags" may direct a user to a portion(s) of the transcript 622 where User 5 discussed this topic and/or highlight multiple portions of the transcript that are associated with this topic.

The action items may represent recommended tasks that a user can perform sometime after the teleconferencing meeting ends. For example, as shown in FIG. 6, AI notes may include a first action item 618(1) associated with User 6 and a second action item 618(2) associated with User 7. In some examples, the action items may be associated with a due data. An action item may be associated with or directed to a single user, a group of users, or directed to users associated with a communication channel or other virtual space (e.g., a task may state "Upload document A to Channel A"). In some examples, the action item(s) may be associated with an urgency level. For example, first action item 618(1) may be associated with a first urgency level represented by a first symbol (e.g., a single exclamation mark, a yellow-colored symbol) and the second action item 618(2) may be associated with a second urgency level represented by a second symbol (e.g., third exclamation marks, a red colored symbol, etc.). An urgency level may be based at least in part on a due date associated with the action item, the user associated with the action item, a status or role of the user that suggested the action item (e.g., a manager suggested that an employee complete an action item), the context or relevancy of the action item, and the like.

In some examples, one or more users may collaborate on the AI notes during the teleconferencing meeting (e.g., comment and/or edit the AI notes 610 as they are generated). For example, a user may select an edit affordance 612 to add or delete text, edit an urgency of an action item, edit the responsible users for the action item, etc. In some examples, one or more users may edit the text of the AI notes without first having to select an edit affordance. In some examples, prior to initiating an audio and/or video meeting and/or during the meeting, a user may indicate what information is to be included in the AI notes. For instance, a user may indicate that AI notes provide a list of questions and answers discussed during the meeting, action items, suggestions provided by a particular user, etc.

In some examples, the summary and/or the AI notes generated during the teleconferencing meeting may be automatically uploaded to another virtual space (e.g., a canvas, a channel, etc.). In some examples, a user may select an export affordance 614 associated with the AI notes 610. Selecting the export affordance 614 may present the user with one or more options (e.g., via a pop-up window or sidebar) to select a location to export the AI notes to. In some examples, the AI notes may automatically be exported to a designated location in the communication platform (e.g., to the channel that the audio and/or video meeting was initiated from or a canvas associated with the channel) sometime after the teleconferencing meeting ends.

In some examples, the user interface may present tools 628. The tools 628 enable a user to perform actions and/or control features of teleconferencing meeting. For example, a selectable element may enable the user to mute the user's microphone, turn the user's camera on/off, share the user's screen, send a reaction (e.g., an emoji), update a user setting, leave the teleconferencing meeting, and/or invite other users. The screen share button may permit a user to share the user's screen with other attendees of the teleconferencing meeting as well as provide a user with additional controls during a screen share. For example, a user sharing the user's screen may be provided with additional screen share controls to specify which screen to share, to annotate the shared screen, or to save the shared screen.

Figure 7:
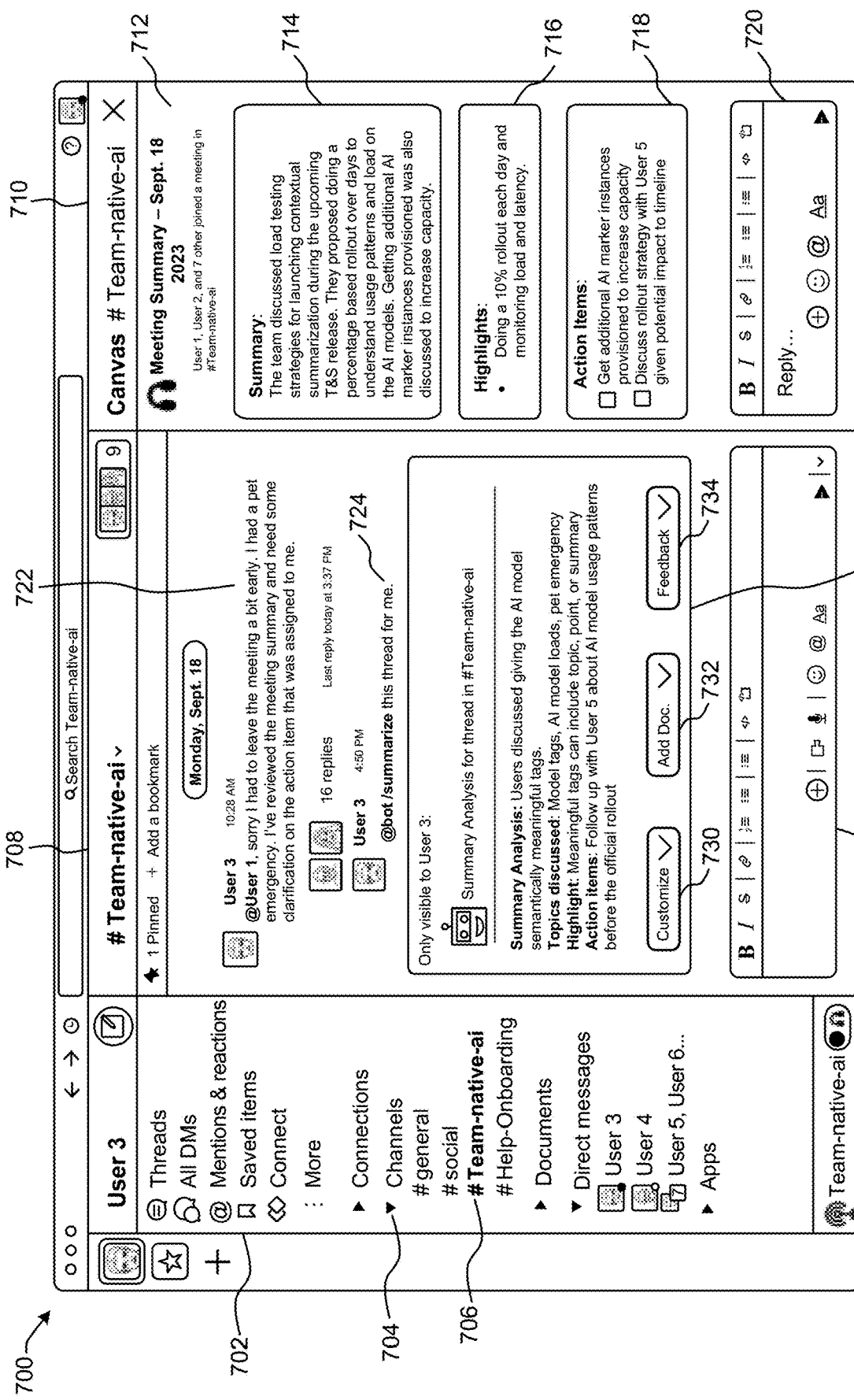
FIG. 7 illustrates an example user interface for requesting and generating a summary of a message thread, as discussed herein.

FIG. 7 illustrates an example user interface 700 for requesting and generating a summary of a message thread in a virtual space (e.g., channel #Team-native-ai). The example user interface 700 may include a navigation pane 702. As described above in relation to FIG. 2A, the navigation pane 702 may include different graphical indicators which may be associated with a variety of virtual spaces, such as channels 704. The example user interface 700 may include any number of channels 704 which may be used to organize conversations between and amongst users according to topics. In some examples, the example user interface 700 may include channels 704 such as a general channel, a social channel, a Team-native-ai channel 706, and/or any other channel. When a user selects a channel 704, a channel pane 708 may be presented. In some examples, the channel pane 708 can include access to content associated with the channel, in addition to enabling users to add other members, post content, and the like. The channel pane 708 may include a user interface object (not shown) which, when actuated (e.g., selected), may display a canvas (e.g., virtual space) associated with the selected channel.

In some examples, the example user interface 700 may include a pane 708 to view virtual space data that has been posted and/or input by user(s) of the virtual space. As described above, some or all channels may include an associated (or corresponding) canvas (e.g., virtual space). That is, the Team-native-ai channel 706 may include an associated canvas configured to curate, organize, and/or share collections of information between users of the Team-native-ai channel 706. The example user interface 700 may include a canvas pane 710. In this example, the canvas pane 710 may indicate that the user is viewing a portion of the Team-native-ai channel canvas.

In some examples, the channel pane 708 may include data (e.g., text) specific to a channel. While in a channel, a user can comment on a message in a "thread." In some examples, a thread can be a message associated with another message that is not posted in a channel, but instead, is maintained within an object associated with an original message. Messages and/or threads can be associated with file(s), emoji(s), app(s), link(s), image(s), video(s), audio, and/or other attachments. The example user interface 700 displays a thread 722 posted by User 3 including a number of replies.

The user interface 700 may include a messaging box 726 that allows users within the channel to post to the virtual space. In some examples, a user may request generation of a thread summary. For example, a user may select an affordance associated with generating a thread summary (not shown). In another example, the summarization engine, using a ML model, can generate a thread summary in response to receiving a command within the messaging box 726. A command may be used to summarize all or a portion of data with a specific thread (e.g., replies, emojis, attachments specific to the thread, links, etc.). Here, the user may input (e.g., type) various commands into the messaging box 726, to call a bot, API, or other program of the communication platform to generate the thread summary. In some examples, the command may be entered as if it were a reply to the thread 722. Example commands include: "@bot/ summarize this thread" to summarize the data within a particular thread, "/summarize data in thread posted by <User 1>," to generate a thread summary of what User 1 posted in particular, or "/summarize data in thread regarding tags" or other topic or keyword. Although a particular command 724 is shown in FIG. 7, other commands are contemplated.

In response to entering the command 724 and submitting the command 724 (e.g., pressing submit, send, enter, etc.), the thread summary 728 may be presented. In some examples, the thread summary 728 may be presented within user interface 700 as a reply to the thread, within a pop-up window, sidebar, etc. The thread summary may be presented as a public post or reply to the summarized thread so other users with access (e.g., permissions) to the channel may view the summary. Alternatively, the thread summary may be private and only viewable to the user that requested the thread summary.

In some examples, the thread summary may be updated in instances where additional communications occur within the thread. For example, an additional reply may be posted to the thread 722 after the thread summary 728 has been generated and, in response, the summarization engine may utilize ML model(s) to generate a second thread summary or update the original thread summary. In some examples, the user(s) that requested the generation of the thread summary may be notified (e.g., receive an automatic message, email, etc.) that a new thread summary is available for review. In some examples, prior to generating a new thread summary, the communication platform may send a notification to the user(s) confirming that the user(s) would like an updated thread summary.

The thread summary 728 may include certain fields, text, and/or affordances. For example, the thread summary 728 may include a summary analysis field, topics and/or keywords discussed in the thread, highlights of the thread, action items for a user to perform, etc. In some examples, the thread summary 728 may present a user with an option to "send an updated summary" in the event the thread receives an additional reply, reactions, etc. In this example, the communication platform may send a user(s) an updated thread summary based in part on determining, using a ML model, that the additional reply alters the thread summary in a substantive way (e.g., a change in a due date, action items, topics discussed, etc.). However, if the additional reply contains information that would be redundant or irrelevant to the original summary thread (e.g., a reply that states "Ok. Have a good weekend!" or a thumbs up emoji), the ML model may determine the new reply, reaction, etc. is not substantively relevant to the original thread summary and not automatically generate an updated thread summary.

In some examples, the thread summary 728 may include a customize affordance 730. Upon receiving an indication of selection of the customize affordance 730, the communication platform may render (e.g., to the pane 708) a window or list (not shown) containing various operations in which the communication platform may modify, update, and/or replace data presented in the thread summary analysis. That is, the customize affordance 730 may enable a user to customize the information presented in the thread summary 728. For example, a user may update an output location of the thread summary, update a permissions associated with the thread summary (public versus private, identify specific users that may view and/or not view the thread summary), change a detail level of the summary (e.g., a verbosity), identify what types of data in the thread the user would like summarized (e.g., include summarization of documents within the thread, but not links) and the like.

In some examples, the thread summary 728 may include an add document (doc.) affordance 732. Responsive to receiving an indication of selection of the add doc. affordance 732, the communication platform can cause a dialog window (not shown) to be presented within the virtual space. The dialog window may include several fields, information inputs, and the like associated with providing a user the option to include an additional document, thread, virtual space, etc. with which to create the thread summary.

In some examples, the thread summary 728 may include a feedback affordance 734. To improve the performance of the ML model(s), the user can provide feedback as to the accuracy of the summary analysis for the thread. For example, a user may edit the thread summary and the edited version can be used to re-train the ML model. In some examples, the user may rate (e.g., from a scale of 1 to 5, etc.) the accuracy of the thread summary analysis.

In some examples, the canvas pane 710 may present a summary of a teleconferencing meeting, such as the one described in relation in FIG. 6. Of course, this is merely an example, and the canvas may be directed to one or more alternative topics. In some examples, the canvas pane 710 may include a teleconferencing meeting summary that may be generated in order to bring a user up-to-speed as to conversations that took place during the teleconferencing meeting. The teleconferencing meeting summary may include a title 712 and indicate a date and/or time the summary was generated.

The teleconferencing meeting summary may include a short summary 714 representing a brief description or synopsis of the teleconferencing meeting and intended to provide a user with insight into what was discussed during the teleconferencing meeting. In some examples, the teleconferencing meeting summary may include highlights 716 of the teleconferencing meeting. For instance, the highlights of the meeting may include the more important or significant moments, points, or outcomes of the meetings. In some examples, highlights may include the key takeaways or noteworthy aspects that efficiently summarize what occurred during the meeting. The highlights of a meeting may depend on the purpose and nature of the meeting, but may include, for example, key discussion points (main topics or issues that were discussed), decisions made during the meeting that were associated with or resolved action items. In some examples, highlights may include achievements or milestones. For example, if the meeting centered around a project or initiative, the accomplishments or milestones reached may be identified as a highlight (e.g., progress that was made on the project, goals achieved, obstacles overcome, etc.). In some examples, a highlight may include key new information or insights that could impact an organization or project. In some examples, a highlight may include a challenge, problem, or issue discussed in the meeting that is crucial to success of a project, as well as proposed solutions or plans to address them. In some examples, a highlight may include a future plan or goal that defines a strategy or objective. In some examples, a highlight may include a key speaker or attendee and the main points and insights the key speaker provided. In some examples, a highlight may include any important questions or concerns raised during the meeting and/or any formal agreements or resolutions that were reached during the meeting (e.g., a policy change, etc.).

In some examples, the teleconferencing meeting summary may include action items 718 or tasks that were identified during the teleconferencing meeting. For instance, the ML model may be configured to detect keywords or phrases that indicate action items (e.g., "to-do," "action," "task," "follow-up," "assign," etc.). In some examples, the action items may be organized based on urgency level, importance, due dates, department, user role or identity, and so forth. The action items, in some examples, may be associated with a particular user, group of users, a virtual space (e.g., a channel).

In some examples, the user interface 700 can include a messaging box 720 that allows users within the channel to post to the canvas. For example, users may type within the messaging box 720, upload images, documents, suggest edits to the summary, react to the summary, and so forth. In response to a message, a messaging component may cause the virtual space to update and display the message. In some examples, the messaging component may identify a mention or tag (e.g., @mention, or other special character) of a username, document, channel etc. that is associated with the communication platform. The mention or tag may be associated with a user identifier. In response to identifying the mention or tag, the messaging component may cause a notification to be presented on a user interface associated with the user identifier.

In some examples, the teleconferencing meeting summary may include other information or additional information regarding the teleconferencing meeting. For instance, the meeting summary may include questions and answers discussed during the meeting, a list of users that joined the meeting and/or a level of participation of individual users in the meeting, key topics, phrases, or keywords that were discussed during the meeting, a summary or recap of a prior meeting that related to the topic, a date of a follow up meeting (e.g., "A follow meeting is scheduled for next week, Sep. 25, 2023"), and the like. In some examples, the meeting summary may include the AI notes generated during the meeting (e.g., AI notes 610), a portion of the AI notes, or an affordance that, when selected, prompts the user device to download the AI notes.

Figure 8:
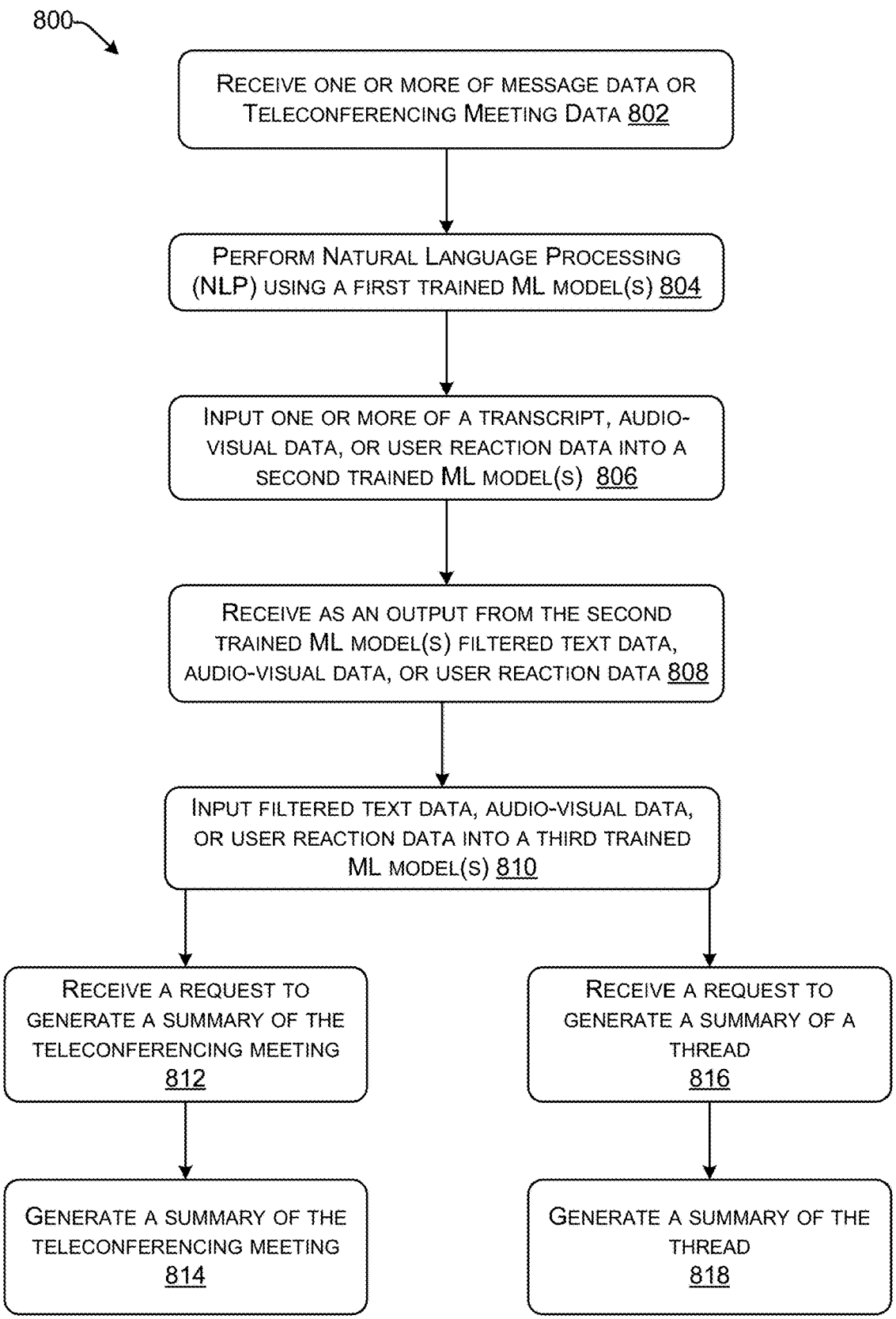
FIG. 8 illustrates an example process associated with generating a summary of a virtual space, as discussed herein.

FIG. 8 illustrates an example process 800 associated with generating a summary of a virtual space (e.g., a summary of a teleconferencing meeting and/or a summary of a message thread). As discussed above, a virtual space can include a means for transmitting written communications among users (e.g., direct message instance, communication channel, canvas, collaborative document, canvas, audio call, video call, etc.).

In some examples, the process 800 at operation 802 may include receiving one or more of message data or teleconferencing meeting data. That is, the process may include obtaining data associated with generating a summary of a teleconferencing meeting, AI notes, a thread summary, etc. The message data and teleconferencing meeting data may be associated with a virtual space of the communication platform and may represent example virtual space data. In some examples, virtual space data may include raw audio-visual data of a teleconferencing meeting, user reaction data, emojis, perceived user expressions (e.g., a gesture detected using machine vision techniques from video data), messages or text input by the user during a meeting, a thread of messages input by a plurality of users (e.g., associated with a channel or virtual space), attachments (e.g., pdf, text, video, photo, etc.), links uploaded to a virtual space, and the like.

In some examples, the process 800 at operation 804 may include performing, using a first trained ML model such as the ML model(s) 142 described above, natural language processing (NLP) on raw audio-visual data to generate transcript data associated with a teleconferencing meeting. In certain cases, generation of transcript data may occur in real-time. Thus, the ML model(s) of some examples may be trained to transform and/or interpret received audio-visual signals and perform one or more of speech recognition, voice recognition, environmental sound recognition or other such audio analysis. In some examples, performing NLP includes statistically correlating one or more interpreted emotions and/or gaze patterns with text data to infer context. In at least one non-limiting example, performing NLP may include determining a semantic distance associated with a recognized term uttered or otherwise input by a participant within a synchronous multimedia collaboration session. Thus, if, for example, a synchronous multimedia collaboration session is initiated within the Team-native-ai channel (which is dedicated to discussion of ongoing machine learning model development), the ML model(s) 142 may be trained to recognize any of the frequently occurring terms "development," "model," "artificial intelligence" or the like as particularly relevant contextually. In this example, embeddings associated with these terms indicate that discussions within the channel are more relevant when generating action items.

In some examples, the ML model(s) 142 can comprise a single ML model or in some examples can comprise a number of ML models with discrete tasks (e.g., a first ML model can convert speech to text, a second ML model can process or filter the text to remove irrelevant text, a third ML model can determine a summary from the filtered text, a fourth ML model can determine action items/relevant details based on context data from a channel, a fifth ML model can output notes in near real time during a synchronous multimedia collaboration session, a sixth ML model may be configured to predict when a summary will likely be requested by a user(s) before the user(s) requests the summary to be generated, and the like). In at least one example, a ML model may be configured to output different types of outputs (e.g., AI notes and a summary of a synchronous multimedia collaboration session) based on receiving different prompts.

In some examples, the process 800 at operation 806 may include inputting, into a second trained ML model, one or more of the transcript generated at operation 804, the raw text data, audio-visual data, user reaction data, and/or other virtual space data. The second ML model may be configured to filter out irrelevant text and improve the efficiency and performance of ML model(s) used to generate summaries and/or AI notes. By removing redundant or irrelevant information, the size of the dataset and, in turn, the computational complexity of the ML model algorithm can be reduced. In some examples, the second ML model may filter the virtual space data using an embedding technique (e.g., word embeddings, user and item embeddings, etc.) by incorporating feature selection into the training process of a ML algorithm (e.g., Lasso and Ridge regression, decision trees, neural networks, etc.), using a filter-based technique involving selecting features based on statistical or mathematical criterion (e.g., variance threshold, correlation-based feature selection, chi-squared test, etc.), using a wrapper method involving selecting features by training a ML model multiple times on different subsets of features (e.g., forward selection, backward elimination, recursive feature elimination, etc.), and the like.

In some examples, the process 800 at operation 808 may include receiving, as an output from the second trained ML model, filtered text data, audio-visual data, user reaction data, and/or other virtual space data.

In some examples, the process 800 at operation 810 may include inputting the filtered text data, audio-visual data, user reaction data, and/or other virtual space data into a third ML model. In some examples, the third ML model may be configured to output one or more of a teleconferencing meeting summary, AI notes, a thread summary, action items, and the like. In at least some cases, the teleconferencing meeting summary, AI notes, a thread summary, and action items may be configured for display within an interface of a display of a user device. Moreover, the teleconferencing meeting summary, AI notes, a thread summary, and/or action items may comprise one or more objects configured for execution by the user device. As described above, the ML model(s) may be configured to output a contextually actionable record or "summary document" representative of a synchronous multimedia collaboration session or thread. That is, the ML model(s) 142 of various examples described herein may be configured to create one or more data structures that may perform tasks within a group-based communication platform. Thus, in at least some cases, the generated summaries may comprise one or more collaborative documents, as described in further detail with reference to FIG. 2D. In at least some cases, the ML model(s) 142 may further be configured to associate one or more summary interface elements (e.g., checkboxes) with the one or more respective summary objects. Each summary interface element may be configured to receive user interaction, and thereby initiate execution of the task(s) associated with the summary object.

In some examples, the process 800 at operation 812 may include receiving a request to generate a summary of the teleconferencing meeting. Alternatively, the process 800 may proceed to operation 814, discussed below. In some instances, a summarization component may receive a request from a user to generate the summary. In some examples, the request can be received in association with a virtual space. In some examples, the request may specify content to be used when generating the teleconferencing meeting summary or context. For example, a user interface may display a dialogue window that allows the user to input specifics or criteria of the summary to be generated via a dialogue window (e.g., generate a summary of what a particular user said, a group of users, a topic discussed, mentions of a keyword or phrase, summarization information received during a specific time or times of the meeting, etc.).

In some examples, the process 800 at operation 814 may include generating the summary of the teleconferencing meeting using a ML model (e.g., a third ML model trained to output a s teleconferencing meeting summaries). For example, a summarization engine 120 may utilize one or more ML models to summarize content discussed, presented, and/or associated with the teleconferencing meeting. In some examples, the teleconferencing meeting summary may be configured for display within an interface of a display of a user interface. In some examples, the teleconferencing meeting summary may include one or more highlights, action items, participant list, AI notes, keywords, a list of questions and answers asked during the teleconferencing meeting, and the like.

In some examples, the process 800 at operation 816 may include receiving a request to generate a summary of a thread. For example, a user may select an affordance associated with generating a thread summary. In another example, the summarization engine, using a ML model, can generate a thread summary in response to receiving a command within a messaging box. A command may request a summary of all or a portion of data associated with a particular thread (e.g., replies, emojis, attachments specific to the thread, links, etc.). For example, a user may input (e.g., type) various commands into a messing box to call a bot, API, or other program of the communication platform to generate, using a ML model, the thread summary.

In some examples, the process 800 at operation 818 may include generating a summary of a thread. That is, a thread summary can be received, as an output, from a ML model trained to output thread summaries. In some instances, the thread summary can be configured for display within an interface of a display of a user device.

Example Clauses

A: A computer-implemented method for summarizing a teleconferencing meeting of a group-based communication platform, the computer-implemented method comprising: receiving teleconferencing meeting data associated with a channel of the group-based communication platform, the teleconferencing meeting data including: audio-visual data; and user reaction data, the user reaction data comprising one or more of: an emoji selected by a user, a detected gesture associated with the user; messages or text input by the user; and a thread of messages input by a plurality of users; performing, using a first trained machine-learning model (MLM), a natural language process (NLP) on the audio-visual data to generate transcript data associated with the teleconferencing meeting; inputting, into a second trained MLM, the audio-visual data and the user reaction data; receiving, as an output from the second trained MLM, a teleconferencing meeting summary associated with the teleconferencing meeting data, wherein the teleconferencing meeting summary is configured for display within an interface of a display of a user device, and further wherein the teleconferencing meeting summary comprises one or more summary objects configured for execution by the user device; and causing display of the teleconferencing meeting summary.

B. The computer-implemented method of paragraph A, wherein receiving the teleconferencing meeting data comprises receiving one or more of the audio-visual data and the user reaction data in real-time.

C. The computer-implemented method of paragraph A or B, wherein causing display of the teleconferencing meeting summary comprises at least causing display of one or more summary interface elements representative of the one or more summary objects.

D. The computer-implemented method of paragraph C, further comprising: responsive to detecting a user interaction with the one or more summary interface elements representative of the one or more summary objects, identifying one or more executable steps associated with the one or more summary objects; and causing execution of the one or more executable steps associated with the one or more summary objects.

E. The computer-implemented method of any of paragraphs A-D, wherein the second trained MLM is trained based on: (i) first data that includes prior audio-visual data; and (ii) second data that includes prior summary data, to determine relationship data between the first data and the second data, such that the second trained MLM is configured to learn to use the relationship data to generate teleconferencing meeting summaries upon input of the audio-visual data.

F. The computer-implemented method of any of paragraphs A-E, further comprising: determining contextual data based in part on channel data associated with the channel of the group-based communication platform; and inputting the contextual data to the second trained MLM, wherein the output from the second trained MLM is further based on the contextual data.

G. The computer-implemented method of any of paragraphs A-F, wherein the contextual data comprises one or more messages generated asynchronously with the audio-visual data.

H. The computer-implemented method of any of paragraphs A-G, further comprising: generating, by the second trained MLM, an action item associated with the teleconferencing meeting summary; generating a user identifier based on the action item; and sending the action item to a computing device associated with the user identifier to be presented in a display associated with an instance of the group-based communication platform associated with the user identifier.

I. The computer-implemented method of any of paragraphs A-H, wherein generating the action item comprises: classifying text associated with the teleconferencing meeting; and determining, based on classifying the text, a relevancy weight associated with the text.

J. The computer-implemented method of any of paragraphs A-I, wherein the messages or text input by the user are input to a user interface proximate video data substantially simultaneously during generation of the audio-visual data.

K. A system comprising: one or more processors; and non-transitory memory storing processor-executable instructions that, when executed by the one or more processors, cause the system to perform operations comprising: receiving teleconferencing meeting data associated with a teleconferencing meeting of a group-based communication platform, the teleconferencing meeting data including audio-visual data and user reaction data; performing, using a first trained machine-learning model (MLM), a natural language process (NLP) on the audio-visual data to generate transcript data associated with the teleconferencing meeting; inputting, into a second trained MLM, the audio-visual data and the user reaction data; receiving, as an output from the second trained MLM, a teleconferencing meeting summary associated with the teleconferencing meeting data, wherein the teleconferencing meeting summary is configured for display within an interface of a display of a user device, and further wherein the teleconferencing meeting summary comprises one or more summary objects configured for execution by the user device; and causing display of the teleconferencing meeting summary.

L. The system of paragraph K, wherein the second trained MLM is trained based on: (i) first data that includes prior audio-visual data; and (ii) second data that includes prior summary data, to learn relationships between the first data and the second data, such that the second trained MLM is configured to learn to use the learned relationships to generate teleconferencing meeting summaries upon input of the audio-visual data.

M. The system of paragraphs K or L, wherein the teleconferencing meeting data is associated with a channel of the group-based communication platform, the operations further comprising: determining contextual data based in part on channel data associated with the channel of the group-based communication platform; and inputting the contextual data to the second trained MLM, wherein the output from the second trained MLM is further based on the contextual data.

N. The system of any of paragraphs K-M, wherein the contextual data comprises one or more messages generated asynchronously with the audio-visual data.

O. The system of any of paragraphs K-N, the operations further comprising: generating, by the second MLM, an action item associated with the teleconferencing meeting summary; generating a user identifier based on the action item; and sending the action item to a computing device associated with the user identifier to be presented in a display associated with an instance of the group-based communication platform associated with the user identifier.

P. The system of any of paragraphs K-O, wherein receiving the teleconferencing meeting data comprises receiving one or more of the audio-visual data and the user reaction data in real-time.

Q. One or more non-transitory computer-readable media storing processor-executable instructions that, when executed by one or more processors, cause the one or more processors to perform operations comprising: receiving teleconferencing meeting data associated with a teleconferencing meeting of a group-based communication platform, the teleconferencing meeting data including audio-visual data and user reaction data; performing, using a first trained machine-learning model (MLM), a natural language process (NLP) on the audio-visual data to generate transcript data associated with the teleconferencing meeting; inputting, into a second trained MLM, the audio-visual data and the user reaction data; receiving, as an output from the second trained MLM, a teleconferencing meeting summary associated with the teleconferencing meeting data, wherein the teleconferencing meeting summary is configured for display within an interface of a display of a user device, and further wherein the teleconferencing meeting summary comprises one or more summary objects configured for execution by the user device; and causing display of the teleconferencing meeting summary.

R. The one or more non-transitory computer-readable media of paragraph Q, the operations further comprising: generating, by the second MLM, an action item associated with the teleconferencing meeting summary; generating a user identifier based on the action item; and sending the action item to a computing device associated with the user identifier to be presented in a display associated with an instance of the group-based communication platform associated with the user identifier.

S. The one or more non-transitory computer-readable media of paragraphs Q or R, wherein the user reaction data comprises messages or text input to a user interface proximate video data substantially simultaneously during generation of the audio-visual data.

T. The one or more non-transitory computer-readable media of any of paragraphs Q-S, wherein the teleconferencing meeting data is associated with a channel of the group-based communication platform, the operations further comprising: determining contextual data based in part on channel data associated with the channel of the group-based communication platform; and inputting the contextual data to the second trained MLM, wherein the output from the second trained MLM is further based on the contextual data.

While the example clauses described above are described with respect to one particular implantation, it should be understood that, in the context of this document, the content of the example clauses can also be implemented via a method, device system, a computer-readable medium, and/or another implementation. Additionally, any of examples A-T may be implemented alone or in combination with any other one or more examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method for summarizing a teleconferencing meeting of a group-based communication platform, the computer-implemented method comprising:

receiving teleconferencing meeting data associated with the teleconferencing meeting that was initiated within a channel of the group-based communication platform, the channel including a subset of users of the group-based communication platform that are authorized to access the channel, the channel being inaccessible to remaining users of the group-based communication platform that are not included in the subset of users, the teleconferencing meeting data including:
audio-visual data; and
user reaction data, the user reaction data comprising one or more of:
an emoji selected by a user,
a detected gesture associated with the user;
messages or text input by the user; and
a thread of messages input by a plurality of users;
performing, using a first trained machine-learning model (MLM), a natural language process (NLP) on the audio-visual data to generate transcript data associated with the teleconferencing meeting;
inputting, into a second trained MLM, the audio-visual data and the user reaction data;
receiving, as an output from the second trained MLM, a teleconferencing meeting summary associated with the teleconferencing meeting data,
wherein the teleconferencing meeting summary is configured for display within an interface of a display of a user device, and further wherein the teleconferencing meeting summary comprises one or more summary objects configured for execution by the user device; and
causing display, via the channel, of the teleconferencing meeting summary.

2. The computer-implemented method of claim 1, wherein receiving the teleconferencing meeting data comprises receiving one or more of the audio-visual data and the user reaction data in real-time.

3. The computer-implemented method of claim 1, wherein causing display of the teleconferencing meeting summary comprises at least causing display of one or more summary interface elements representative of the one or more summary objects.

4. The computer-implemented method of claim 3, further comprising:
responsive to detecting a user interaction with the one or more summary interface elements representative of the one or more summary objects, identifying one or more executable steps associated with the one or more summary objects; and
causing execution of the one or more executable steps associated with the one or more summary objects.

5. The computer-implemented method of claim 1, wherein the second trained MLM is trained based on: (i) first data that includes prior audio-visual data; and (ii) second data that includes prior summary data, to determine relationship data between the first data and the second data, such that the second trained MLM is configured to learn to use the relationship data to generate teleconferencing meeting summaries upon input of the audio-visual data.

6. The computer-implemented method of claim 1, further comprising:
determining contextual data based in part on channel data associated with the channel of the group-based communication platform; and
inputting the contextual data to the second trained MLM, wherein the output from the second trained MLM is further based on the contextual data.

7. The computer-implemented method of claim 6, wherein the contextual data comprises one or more messages generated asynchronously with the audio-visual data.

8. The computer-implemented method of claim 1, further comprising:
generating, by the second trained MLM, an action item associated with the teleconferencing meeting summary;
generating a user identifier based on the action item; and
sending the action item to a computing device associated with the user identifier to be presented in the display or a second display associated with an instance of the group-based communication platform associated with the user identifier.

9. The computer-implemented method of claim 8, wherein generating the action item comprises:
classifying text associated with the teleconferencing meeting; and
determining, based on classifying the text, a relevancy weight associated with the text.

10. The computer-implemented method of claim 1, wherein the messages or text input by the user are input to a user interface proximate video data substantially simultaneously during generation of the audio-visual data.

11. A system comprising:
one or more processors; and
non-transitory memory storing processor-executable instructions that, when executed by the one or more processors, cause the system to perform operations comprising:
receiving teleconferencing meeting data associated with a teleconferencing meeting that was initiated within a channel of a group-based communication platform, the channel including a subset of users of the group-based communication platform that are authorized to access the channel, the channel being inaccessible to remaining users of the group-based communication platform that are not included in the subset of users, the teleconferencing meeting data including audio-visual data and user reaction data;
performing, using a first trained machine-learning model (MLM), a natural language process (NLP) on the audio-visual data to generate transcript data associated with the teleconferencing meeting;
inputting, into a second trained MLM, the audio-visual data and the user reaction data;
receiving, as an output from the second trained MLM, a teleconferencing meeting summary associated with the teleconferencing meeting data,
wherein the teleconferencing meeting summary is configured for display within an interface of a display of a user device, and further wherein the teleconferencing meeting summary comprises one or more summary objects configured for execution by the user device; and
causing display, via the channel, of the teleconferencing meeting summary.

12. The system of claim 11, wherein the second trained MLM is trained based on: (i) first data that includes prior audio-visual data; and (ii) second data that includes prior summary data, to learn relationships between the first data and the second data, such that the second trained MLM is configured to learn to use the relationships to generate teleconferencing meeting summaries upon input of the audio-visual data.

13. The system of claim 11, the operations further comprising:
 determining contextual data based in part on channel data associated with the channel; and
 inputting the contextual data to the second trained MLM, wherein the output from the second trained MLM is further based on the contextual data.

14. The system of claim 13, wherein the contextual data comprises one or more messages generated asynchronously with the audio-visual data.

15. The system of claim 11, the operations further comprising:
 generating, by the second trained MLM, an action item associated with the teleconferencing meeting summary;
 generating a user identifier based on the action item; and
 sending the action item to a computing device associated with the user identifier to be presented in the display or a second display associated with an instance of the group-based communication platform associated with the user identifier.

16. The system of claim 11, wherein receiving the teleconferencing meeting data comprises receiving one or more of the audio-visual data and the user reaction data in real-time.

17. One or more non-transitory computer-readable media storing processor-executable instructions that, when executed by one or more processors, cause the one or more processors to perform operations comprising:
 receiving teleconferencing meeting data associated with a teleconferencing meeting that was initiated within a channel of a group-based communication platform, the channel including a subset of users of the group-based communication platform that are authorized to access the channel, the channel being inaccessible to remaining users of the group-based communication platform that are not included in the subset of users, the teleconferencing meeting data including audio-visual data and user reaction data;
 performing, using a first trained machine-learning model (MLM), a natural language process (NLP) on the audio-visual data to generate transcript data associated with the teleconferencing meeting;
 inputting, into a second trained MLM, the audio-visual data and the user reaction data;
 receiving, as an output from the second trained MLM, a teleconferencing meeting summary associated with the teleconferencing meeting data,
 wherein the teleconferencing meeting summary is configured for display within an interface of a display of a user device, and further wherein the teleconferencing meeting summary comprises one or more summary objects configured for execution by the user device; and
 causing display, via the channel, of the teleconferencing meeting summary.

18. The one or more non-transitory computer-readable media of claim 17, the operations further comprising:
 generating, by the second trained MLM, an action item associated with the teleconferencing meeting summary;
 generating a user identifier based on the action item; and
 sending the action item to a computing device associated with the user identifier to be presented in the display or a second display associated with an instance of the group-based communication platform associated with the user identifier.

19. The one or more non-transitory computer-readable media of claim 17, wherein the user reaction data comprises messages or text input to a user interface proximate video data substantially simultaneously during generation of the audio-visual data.

20. The one or more non-transitory computer-readable media of claim 17, the operations further comprising:
 determining contextual data based in part on channel data associated with the channel; and
 inputting the contextual data to the second trained MLM, wherein the output from the second trained MLM is further based on the contextual data.

* * * * *